(12) United States Patent
Ishigaki et al.

(10) Patent No.: US 6,390,449 B1
(45) Date of Patent: May 21, 2002

(54) GATE VALVE

(75) Inventors: Tsuneo Ishigaki, Saitama-ken; Kenji Waragai; Ikuo Kanzaka, both of Ibaraki-ken, all of (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/593,367

(22) Filed: Jun. 14, 2000

(30) Foreign Application Priority Data

Jun. 14, 1999 (JP) ............................................ 11-167545
Jun. 14, 1999 (JP) ............................................ 11-167547

(51) Int. Cl.$^7$ .......................................... F16K 31/122
(52) U.S. Cl. ...................................... 251/193; 251/204
(58) Field of Search ............................... 251/158, 193, 251/204

(56) References Cited

U.S. PATENT DOCUMENTS 4,721,282 A * 1/1988 Shawver et al. ............... 251/62
5,415,376 A 5/1995 Ito ............................. 251/158
5,641,149 A 6/1997 Ito ............................. 251/158

FOREIGN PATENT DOCUMENTS

JP 2613171 5/1997

* cited by examiner

Primary Examiner—John Fox
(74) Attorney, Agent, or Firm—Paul A. Guss

(57) ABSTRACT

A gate valve is disclosed comprising an elevatable lever member connected to a piston rod, a displacement member for making up and down movements integrally with the lever member and being tiltably disposed about supporting rollers acting as a pivot point or fulcrum at an end position of displacement, spring members interveningly disposed between the lever member and the displacement member, pin members fixed into side surfaces of the lever member, and engaging grooves formed in side surfaces of the displacement member and engaging with the pin members.

16 Claims, 27 Drawing Sheets

F I G. 15
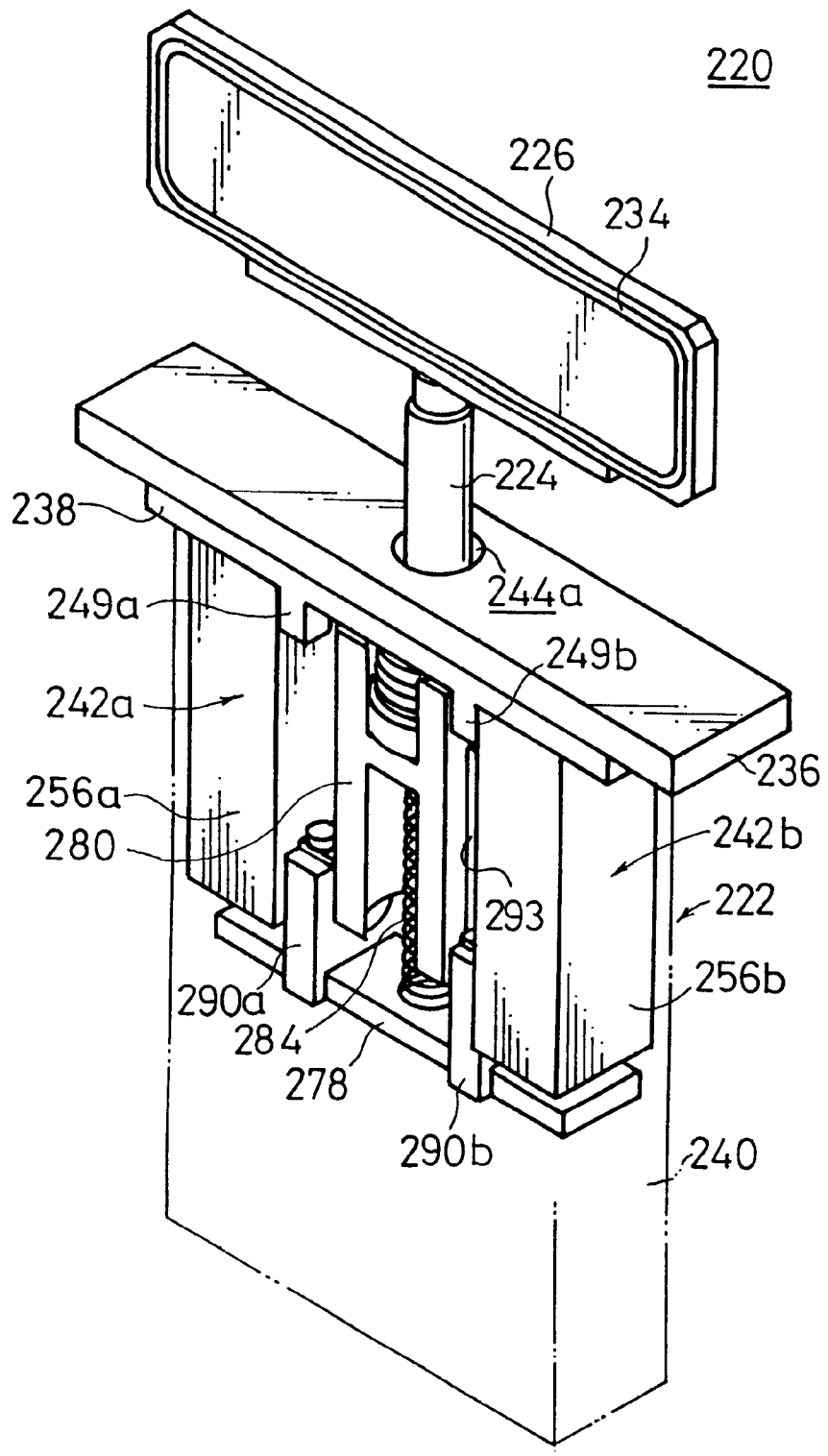

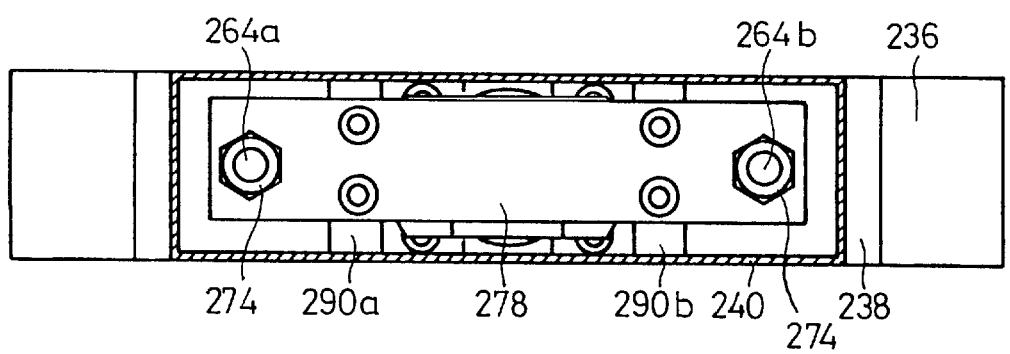
F I G. 19

F I G. 24
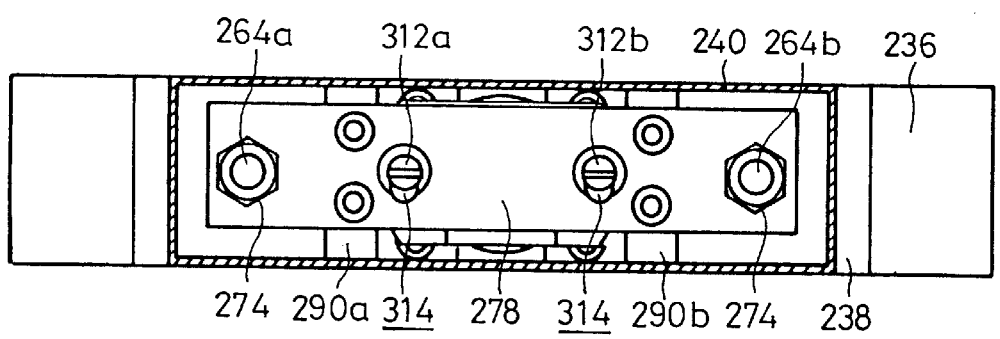

GATE VALVE

BACKGROUND OF THE INVENTION

1. Field of the Invention

The present invention relates to a gate valve capable of opening and closing a transfer path for transferring a workpiece, for example an integrated circuit (IC) or components therefor, from one vacuum processing chamber to another vacuum processing chamber, or for opening and closing a fluid flow path, or an exhaust flow path, for a pressurized fluid or gas or the like.

2. Description of the Related Art

Conventionally, in processing apparatuses for semiconductor wafers or liquid crystal substrates for example, insertion and withdrawal of such semiconductor wafers or liquid crystal substrates from various kinds of processing chambers is undertaken via communication passageways, wherein within such passageways, respectively, gate valves are disposed for opening and closing the communication passageways.

For example, as disclosed in Japanese Patent Document No. 2,613,171 (corresponding to U.S. Pat. Nos. 5,415,376 and 5,641,149), such a gate valve is disposed in such a way that, after a valve disk arrives at an opposing position with respect to a valve seat by direct advancing movement of a valve rod displaced under an actuating operation of a cylinder, the valve disk is pressed into contact and seated on the valve seat by an inclining movement of the valve rod, thereby closing a communication passageway formed within a valve box.

More specifically, as shown in FIGS. 27 and 28, the gate valve according to the conventional technique comprises a valve box 3 having formed therein a communication passageway 2 for insertion and withdrawal of a workpiece, a valve disk 5 for opening and closing the communication passageway 2 by means of seating the valve disk 5 onto a valve seat 4 formed within the valve box 3, and a valve rod 6 connected to the valve disk 5 and capable of making up and down movements as well as being tiltably movable.

A valve block 7 is connected to an upper portion of the valve rod 6, wherein on both side surfaces of the valve block 7 pivot axles 11 are attached which are displaced along guide grooves 10 (see FIG. 29) which are formed respectively in both side surfaces of the cylinder tubes 9 of a pair of cylinders 8a, 8b, and wherein the block 7 is disposed so as to move up and down and to be tilted under a guiding action of the guide grooves 10 which engage with the pivot axles 11. The cylinder tube 9, block 7 and pivot axles 11 are each formed respectively from a metallic material.

Stated otherwise, the block 7 is structured for making a direct advancing movement along the vertical direction in unison with a yoke 13 via a contracting spring 12 which exerts a pulling force, while under a guiding action of the guide grooves 10 which engage with the pivot axles 11, and in addition, for making a tilting movement in the direction of arrow A with the axles 11 serving as a pivot point (fulcrum) when supported by curved lower ends 10a (see FIG. 29) of the guide grooves 10 (see FIG. 28). As a result, the disk 5, with the axles 11 serving as a fulcrum, makes a tilting movement in the direction of arrow B and is seated on the valve seat 4, whereby the communication passageway 2 is airtightly closed.

Moreover, reference numeral 14 indicates a cross-sectionally diamond shaped cam plate, wherein by displacement of the cam plate 14 so as to become substantially horizontal, the block 7 is caused to undergo inclined movement in the direction of arrow A, with the lower curved parts 10a of the guide grooves 10 serving as a fulcrum.

Notwithstanding, with the gate valve according to the above-mentioned conventional technique, because the block axles are disposed for sliding displacement along guide grooves formed in both side surfaces of the cylinders, over extended periods of use, the axles are subjected to frictional wear and hence become deformed, so that a disadvantage results in that their guiding function is lessened in ability.

Further, in the gate valve according to the conventional technique, because axles must be disposed on both sides of the valve block, the number of parts increases, and in addition, a process step for machining or cutting out the guide grooves in both sides of the cylinders becomes necessary, so there is the disadvantage of increased production costs.

Furthermore, in the gate valve according to the conventional technique, as a result of the fact that the axles of the valve block which are formed of a metallic material are slidingly displaced in contact along guide grooves of the cylinder tubes which likewise are formed from a metallic material, dirt or dust and so forth tends to develop. Stated otherwise, a further disadvantage results in that, due to generation of dust caused by friction between the metallic parts, the device cannot be used in an environment which demands purity, such as a clean room or the like.

SUMMARY OF THE INVENTION

A general object of the present invention is to provide a gate valve in which, by eliminating the need for a guide means, the number parts can be decreased, and thereby production costs can be reduced.

A further main object of the present invention is to provide a gate valve capable of being suitably used in an environment demanding purity, by suppressing generation of dust, dirt and the like.

Another object of the present invention is to provide a gate valve in which there is disposed a positioning support structure for integrally maintaining a first displacement member and a second displacement member in a predetermined positional state along a displacement direction, and which is capable of maintaining the position-determined condition of the first and second displacement members, even after extended periods of use.

The above and other objects, features and advantages of the present invention will become apparent from the following description when taken in conjunction with the accompanying drawings in which preferred embodiments of the present invention are shown by way of illustrative example.

BRIEF DESCRIPTION OF THE DRAWINGS

FIG. 15 is an outline perspective view of a gate valve in accordance with a third embodiment of the present invention;

FIG. 19 is a lateral cross-sectional view along the line XIX—XIX shown in FIG. 17;

FIG. 24 is a lateral cross-section view along the line XXIV—XXIV shown in FIG. 23;

DESCRIPTION OF THE PREFERRED EMBODIMENTS

Figure 1:
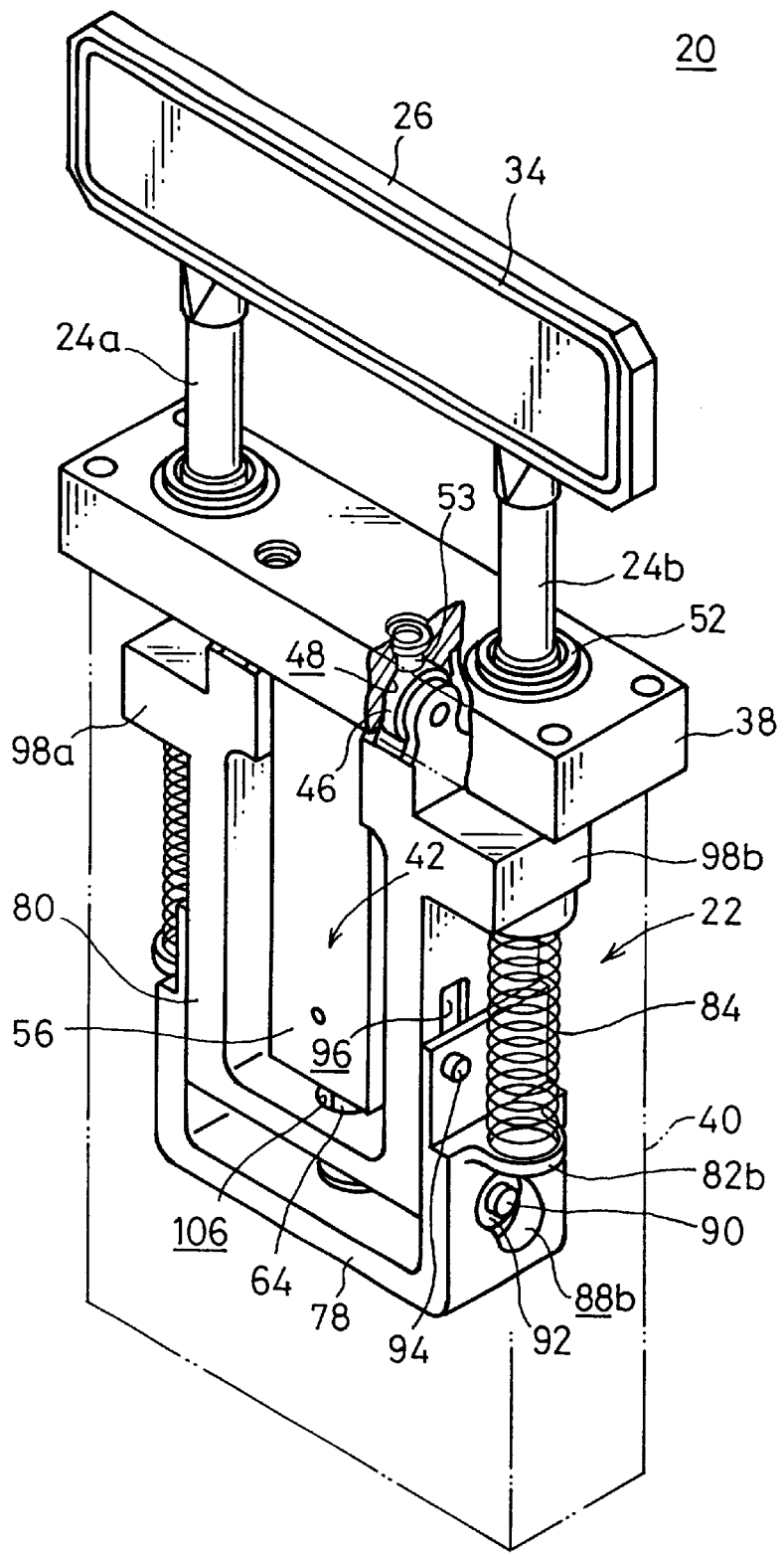
FIG. 1 is an outline perspective view of a gate valve according to a first embodiment of the present invention.

In FIG. 1, reference numeral 20 indicates a gate valve according to a first embodiment of the present invention.

The gate valve 20 includes a drive means 22, a pair of valve rods 24a, 24b displaceable in upward and downward directions under a driving action of the drive means 22, and further being tiltably movable in a direction perpendicular to the up/down directions, and a longitudinally shaped valve disk 26 connected to end parts of the valve rods 24a, 24b. Annular steps 27a, 27b are formed respectively on the outer circumferential surfaces of the end sides and substantially central positions of the valve rods 24a, 24b (see FIG. 3).

A valve box 30 (see FIGS. 7 and 8) defining therein a communication passageway 28 for withdrawal and insertion of non-illustrated workpieces is disposed at an upper side of the drive means 22, wherein by seating of the valve disk 26 onto a valve seat 32 formed by an inner wall surface of the valve body 30, the communication passageway 28 is airtightly shut. A seal member 34 is disposed along an annular groove in the valve disk 26, so that an airtight condition when the valve disk 26 is seated onto the valve seat 32 is maintained by the seal member 34.

The drive means 22 includes a base plate 38 affixed to a bottom surface of the valve box 30 through screw members 36 (see FIG. 3), a bottomed tubular casing 40 attached to the base plate 38, and a cylinder mechanism (drive source) 42 arranged inside the casing 40.

Figure 2:
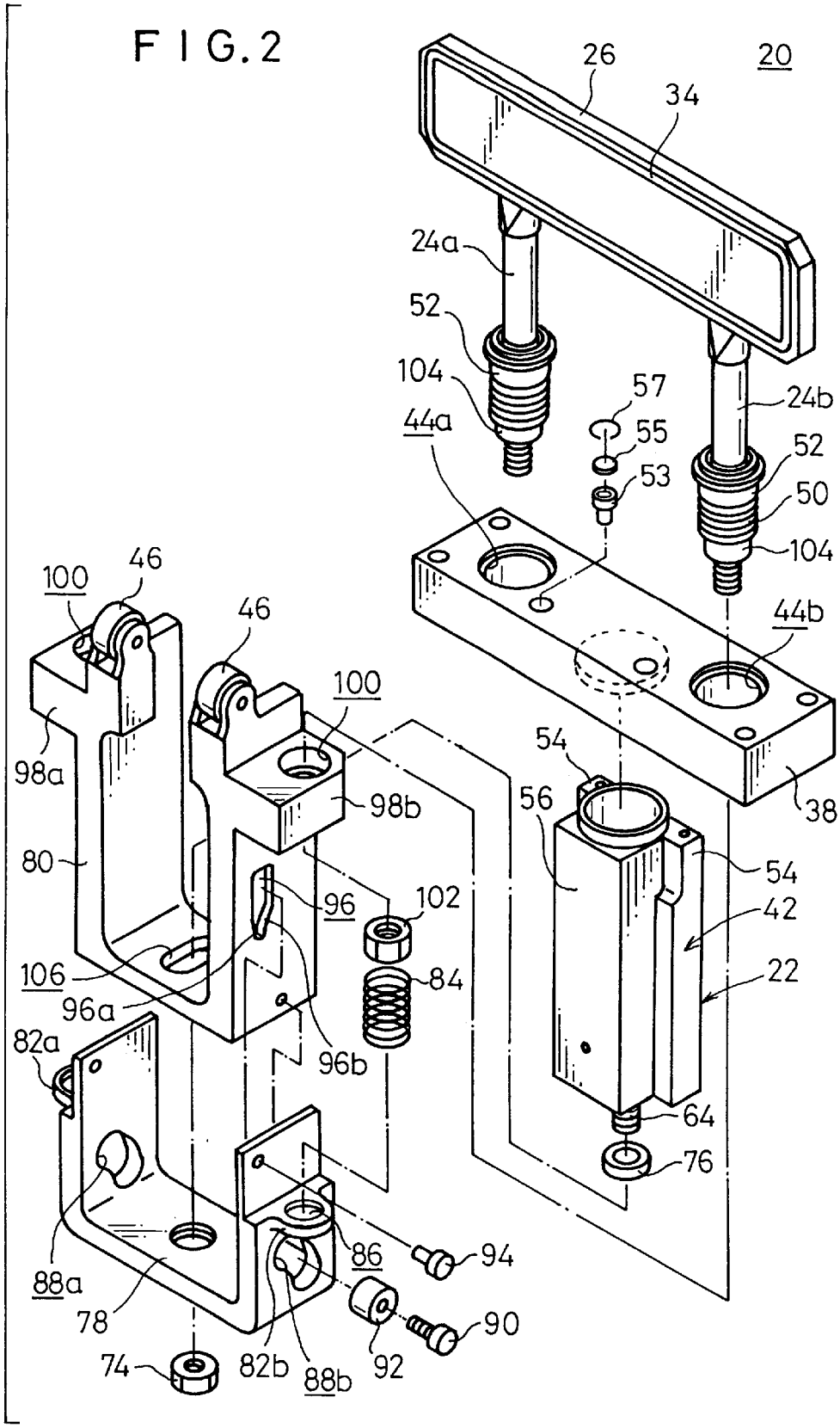
FIG. 2 is a exploded cutaway view of the gate valve shown in FIG. 1.

As shown in FIG. 2, a pair of through holes 44a, 44b substantially circular in cross-section are formed on the base plate 38 for insertion therethrough of the pair of valve rods 24a, 24b. Further, on a lower surface of the base plate 38, concave recesses 48 which are semicircular in cross-section (see FIG. 1) are formed for receiving and supporting support rollers (support members) to be discussed later. The diameters of the through holes 44a, 44b are formed slightly larger than the diameters of the valve rods 24a, 24b, and further, rings 52 holding end parts of bellows 50 which cover given portions of the valve rods 24a, 24b are fitted into the through holes 44a, 44b.

Figure 9:
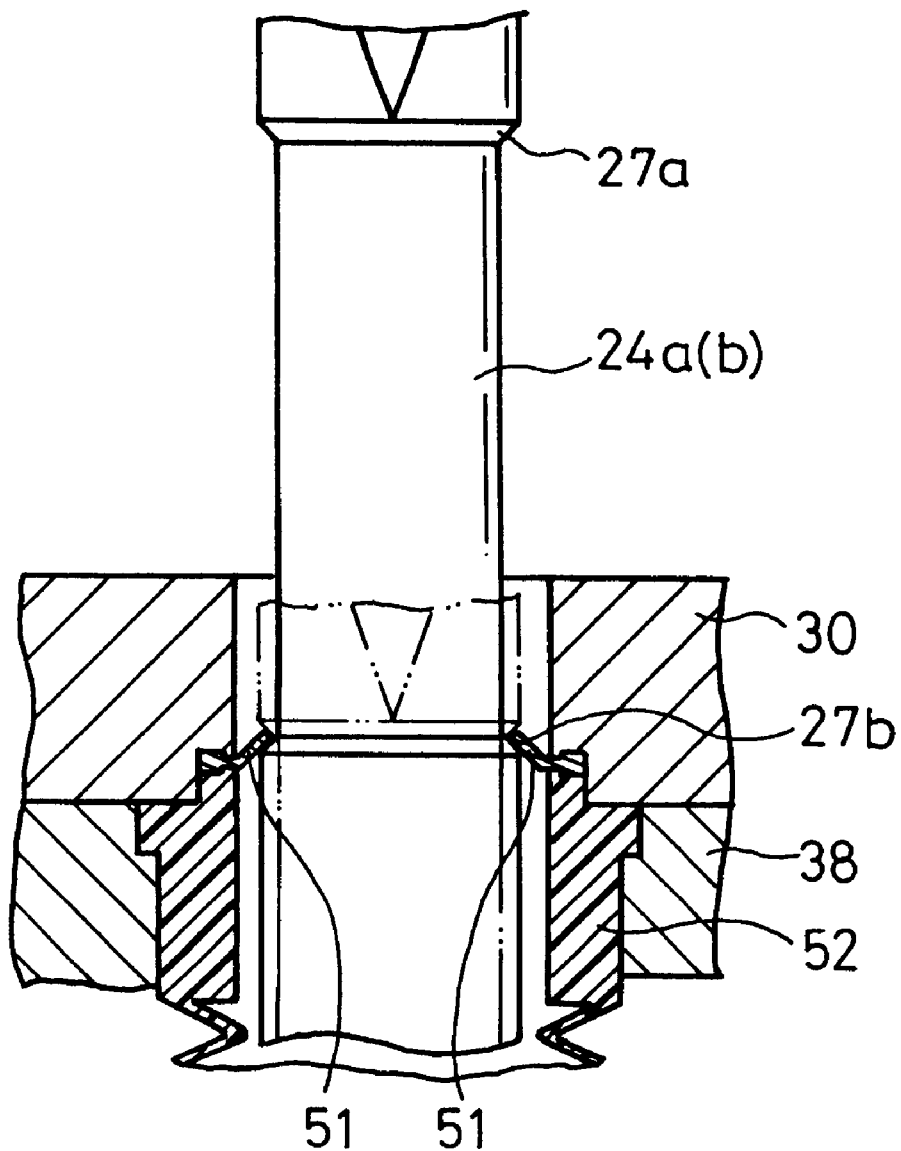
FIG. 9 is a partial expanded vertical cross-sectional view showing a packing for sealing a valve rod.

As shown in FIG. 9, between the bellows 50 and the valve box 30, there is disposed in sandwiching relation a packing (seal member) 51 surrounding an outer peripheral surface of the valve rods 24a, 24b. The packing 51 serves a sealing function by making contact with the annular step 27a at the upper side, as well as the annular step 27b at the lower side of valve rods 24a, 24b, when the piston reaches its top dead point and bottom dead point, respectively, which are at positions corresponding to the end points of displacement of the piston. Further, when the piston is between its top and bottom dead points, because the packing 51 is disposed so as to remain out of contact with the circumferential surface of the valve rods 24a, 24b, generation of dust and dirt due to friction is prevented.

Figure 10:
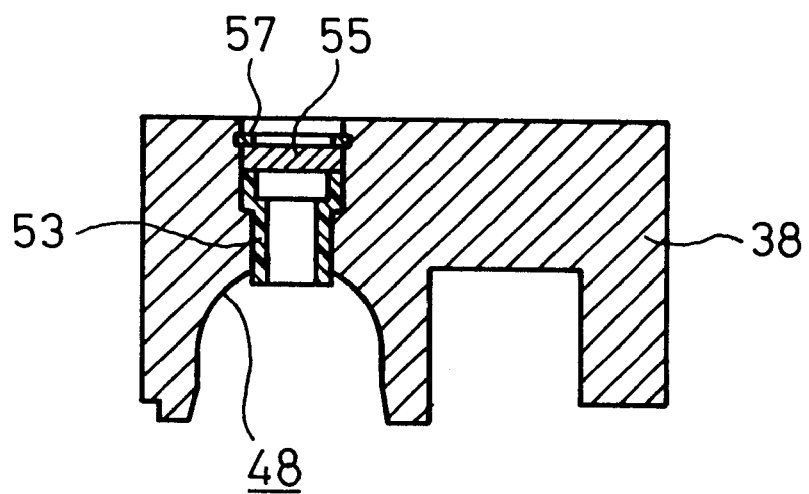
FIG. 10 is a vertical cross-sectional view of a base plate taken along a direction perpendicular to the axial direction.
Figure 11:
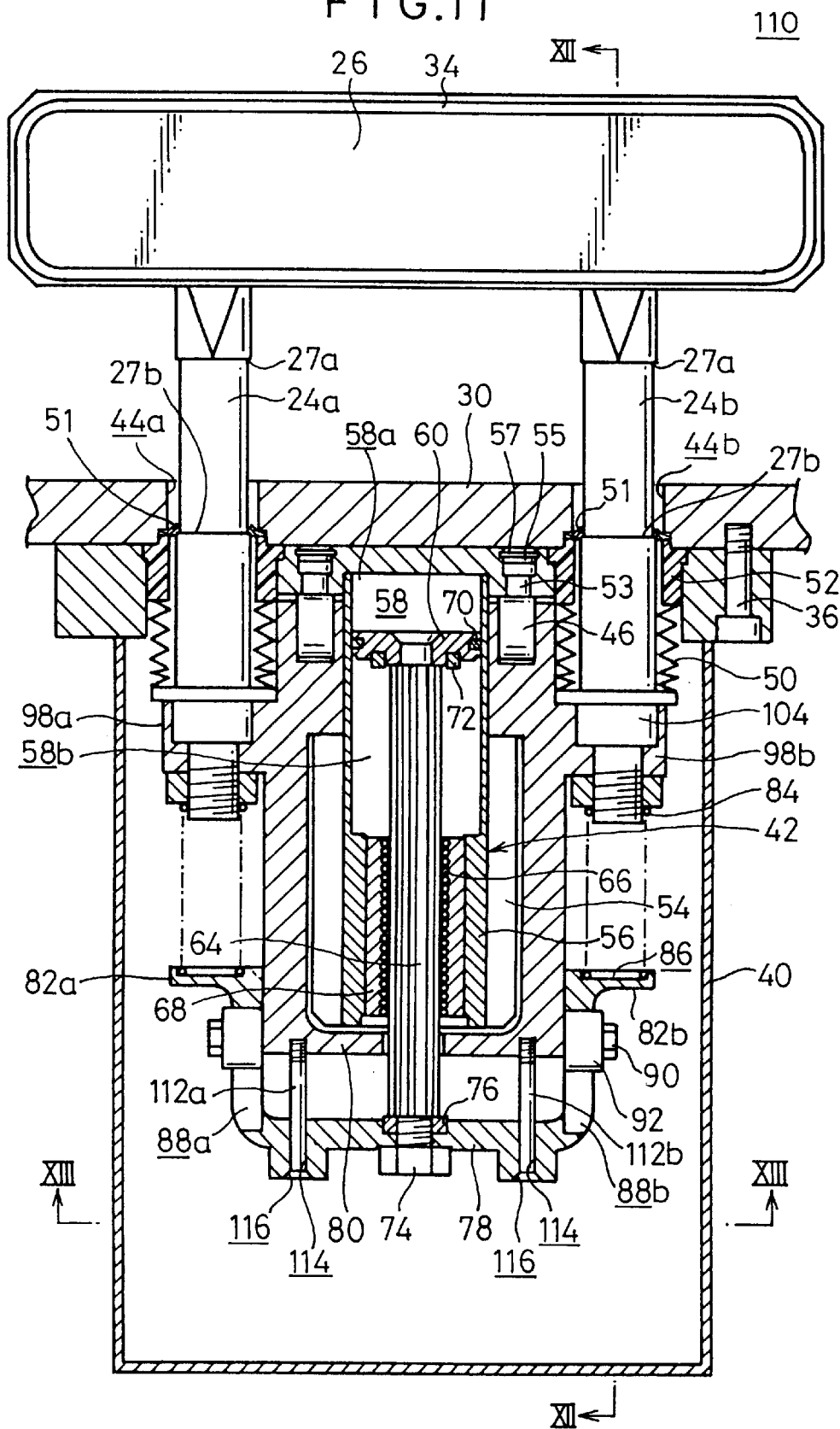
FIG. 11 is a vertical cross-sectional view along the axial direction of a gate valve according to a second embodiment of the present invention.
Figure 12:
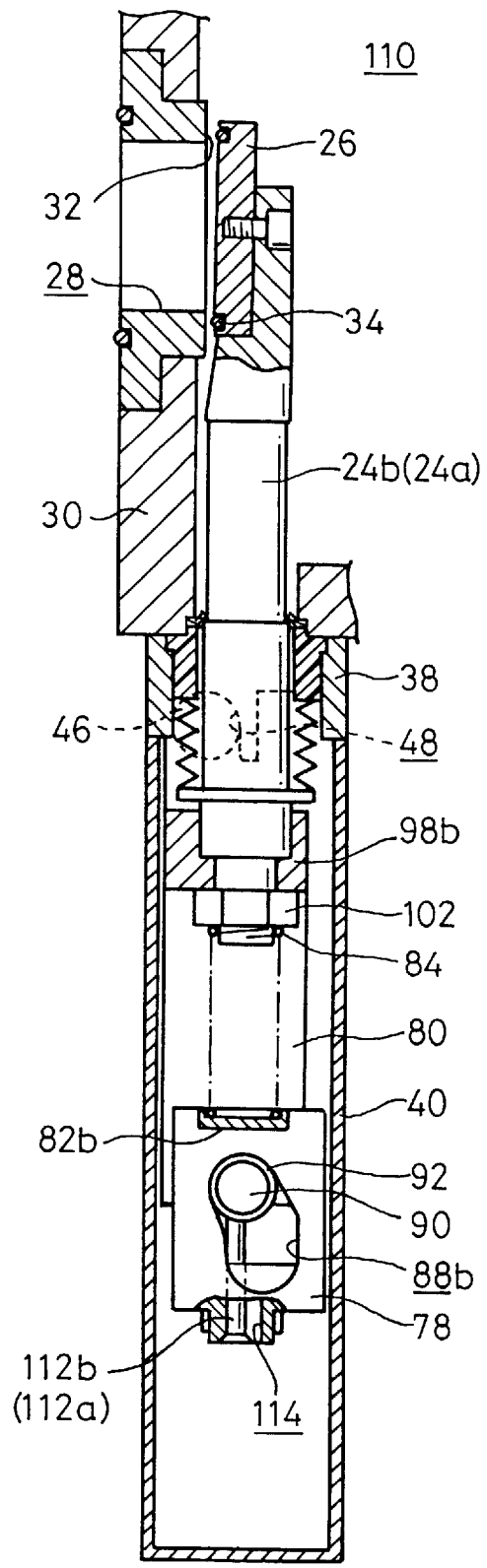
FIG. 12 is a vertical cross-sectional view along the line XII—XII shown in FIG. 11.
Figure 13:
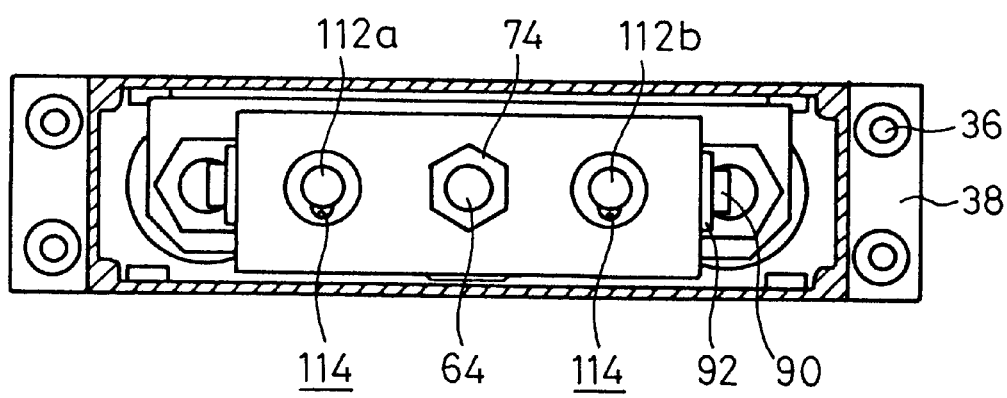
FIG. 13 is a lateral cross-sectional view along the line XIII—XIII shown in FIG. 11.

Further, as shown by FIG. 10, first cushioning members 53 which are formed of a resinous material, for example, a urethane or polyurethane resin or the like, are disposed inside holes in the base plate 38, the first cushioning members 53 being fixed in the holes by means of metal fittings 55 and stop rings 57. The first cushioning members 53 abut with the support rollers 46, serving a function for absorbing a shock of the support rollers 46 when the support rollers 46 engage with the convex recesses 48.

Figure 3:
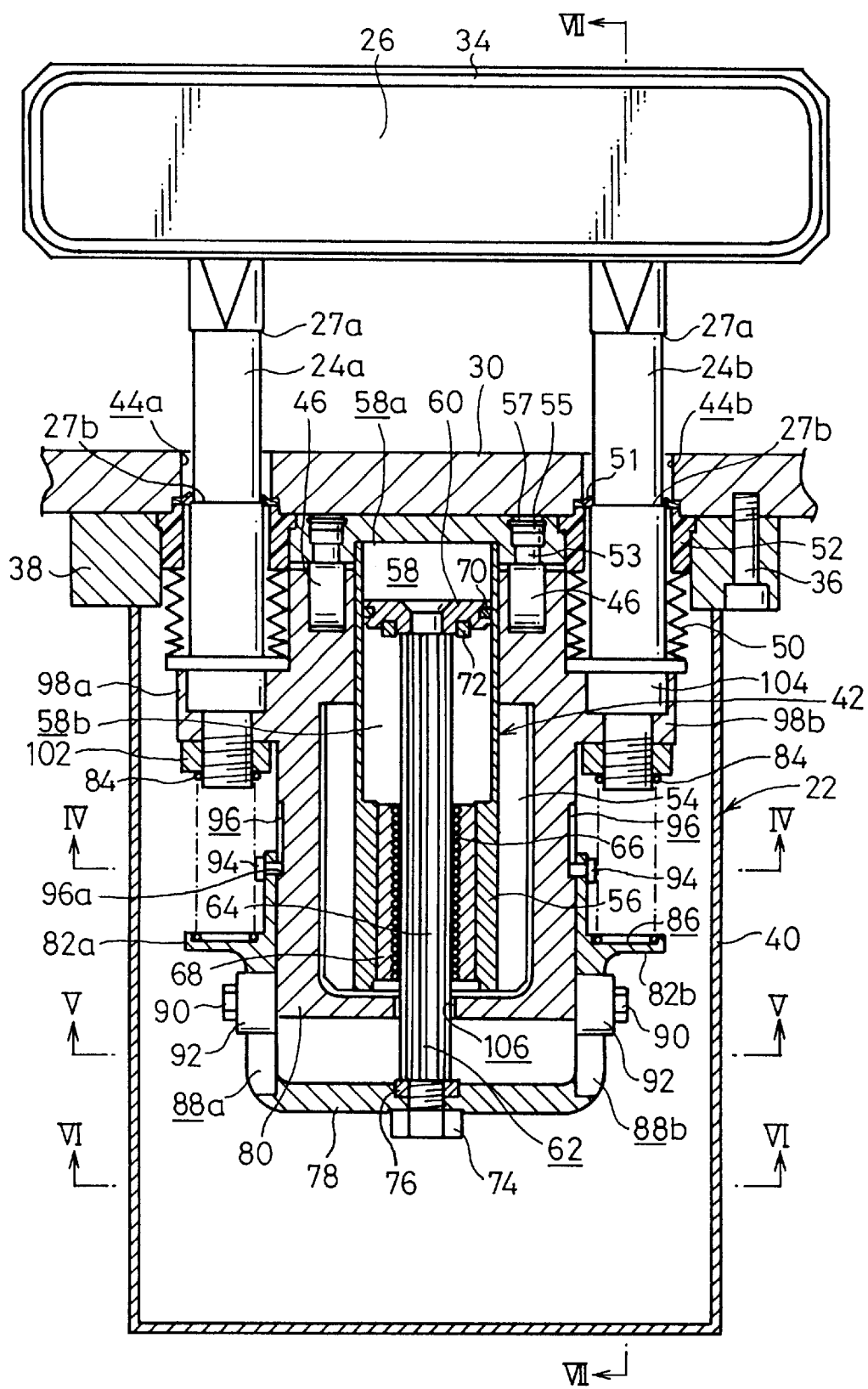
FIG. 3 is a vertical cross-sectional view along an axial direction of the gate valve shown in FIG. 1.

As shown in FIG. 3, the cylinder mechanism 42 includes a cylinder tube 56 formed with respective step portions 54 (see FIG. 2) extending along an axial direction on both side surfaces thereof, and having an end part affixed to the base plate 38 through non-illustrated screws, a piston 60 arranged for displacement along a cylinder chamber 58 defined inside the cylinder tube 56, a piston rod 64 connected to one end of the piston 60 and having spline grooves 62 formed extending along the axial direction on an outer circumferential surface thereof, and a spline axis receiving member 68 having disposed therein a plurality of balls 66 which engage with the spline grooves 62 of the piston rod 64.

A piston packing 70 for preserving airtightness between respective upper side 58a and lower side 58b cylinder chambers, which are divided by the piston 60, is fitted over an outer peripheral surface of the piston 60. Further, a second cushioning member 72 is arranged on a bottom surface part closely adjacent to the piston packing 70, for absorbing a shock when the piston 60 reaches its bottom dead point and the second cushioning member 72 abuts an upper end of the spline receiving member 68. The second cushioning member 72 may suitably be formed of a resinous material, for example, a urethane resin, polyurethane resin or the like.

A pressurized fluid (for example, pressurized air) is supplied through a non-illustrated tube connected to a pressurized fluid supply source (also not shown) to the upper and lower side cylinder chambers 58a, 58b, whereby under a switching action of a non-illustrated directional control valve, pressurized fluid is supplied to either one of the upper side cylinder chamber 58a or lower side cylinder chamber 58b.

Further, as shown in FIGS. 2 and 3, the drive means 22 includes a lever member (first displacement member) 78 affixed to another end of the piston rod 64 through a lock nut 74 and spacer 76, and a further displacement member (second displacement member) 80 for integral displacement together with the lever member 78.

A pair of projections 82a, 82b which project a predetermined length only in a lateral direction are formed on both side surfaces of the substantially parallel extending lever member 78, wherein substantially circular shaped recesses 86 into which spring members 84 (discussed later) are seated, are formed on the projections 82a, 82b. Substantially elliptically shaped elongate holes 88a, 88b are cut out in both side surfaces of the lever member 78, and rollers 92, which are fixed to the displacement member 80 by pins 90, are disposed for engagement with the elongate holes 88a, 88b.

Further, a pair of pin members 94 are fitted through holes into upper sides of both side surfaces of the lever member 78, wherein ends of the pin members 94 are disposed for engagement with engaging grooves 96 formed in both side surfaces of the displacement member 80.

As shown in FIGS. 2 and 3, a pair of flanges 98a, 98b projecting a predetermined length only in the lateral direction are formed in both substantially parallel extending side surfaces of the displacement member 80. Holes 100, which are substantially circular shaped in cross-section, and into which other ends of the valve rods 24a, 24b are fitted, are formed in the flange members 98a, 98b, wherein the valve rods 24a, 24b are fixed to the displacement member 80 via lock nuts 102 which are threaded onto threads on the valve rods 24a, 24b.

Spring members 84 are interveningly disposed, respectively, between the pair of flanges 98a, 98b of the displacement member 80 and the pair of projections 82a, 82b of the lever member 78, wherein ends of the spring members 84 are seated on ends of the valve rods 24a, 24b which are fixed to the flange members 98a, 98b, whereas other ends of the spring members 84 are seated on the circular recesses 86 of the projections 82a, 82b.

Bellows 50 are disposed on other ends of the valve rods 24a, 24b in covering relation to the outer peripheral surfaces thereof, wherein ends of the bellows 50 are rotatably connected to ring bodies 52 which are held in the base plate 38, wherein the other ends thereof are fixedly attached onto ring bodies 104 which are fitted externally around the valve rods 24a, 24b.

Further, engagement grooves 96 for engagement with ends of pin members 94 which are held in place in the lever member 78 are formed in both side surfaces of the displacement member 80. Through engagement of the pin members 94 with lower ends 96a of the engagement grooves 96, the lever member 78 and displacement member 80 are prevented from sliding off position in the up/down directions as well as the forward/reverse directions (i.e. directions substantially perpendicular to the page as shown in FIG. 3), and moreover, remain in a set positional state, at a fixed interval separation, along the up/down direction, and in this manner are moved upward and downward integrally while retaining their set positional state. Also, by withdrawal of the pin members 94 away from lower ends 96a of the engagement grooves 96 and raising of the pins 94 along the inclined portions 96b (see FIG. 2) thereof, the valve disk 26 becomes tiltably movable.

Figure 4:
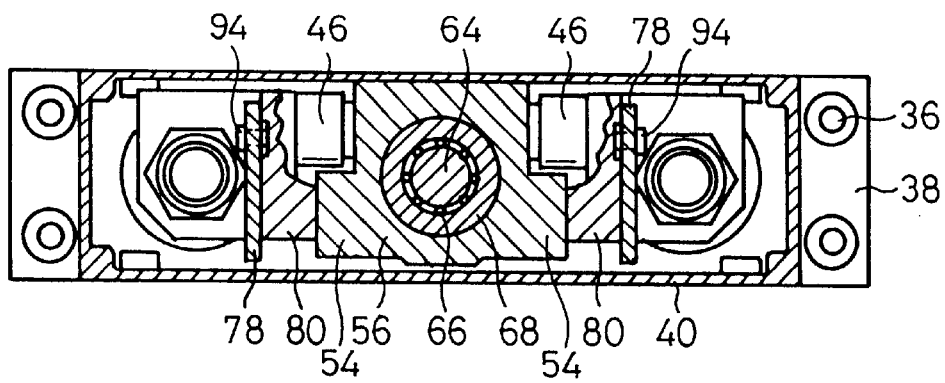
FIG. 4 is a lateral cross-sectional view along the line IV—IV shown in FIG. 3.

Further, a pair of support rollers 46 are rotatably axially supported on upper parts branching from the displacement member 80 in a forked manner, wherein such support rollers 46, as shown in FIG. 4, are disposed in a non-contacting manner with respect to the stepped portions 54 of the cylinder tube 56 by a given clearance. In addition, the support rollers 46 become inserted into curved concave recesses 48 of the base plate 38 at the end point of displacement of the displacement member 80 (see FIG. 1), wherein the support rollers 46 in engagement with the recesses 48 serve as a fulcrum, whereby the valve disk 20, valve shafts 24a, 24b and the displacement member 80 are tilted by a predetermined angle $\theta$ only (see FIG. 8).

Figure 5:
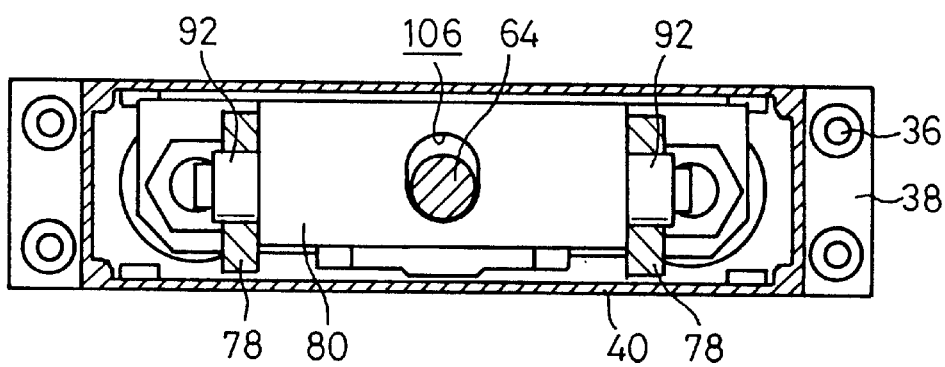
FIG. 5 is a lateral cross-sectional view along the line V—V shown in FIG. 3.
Figure 6:
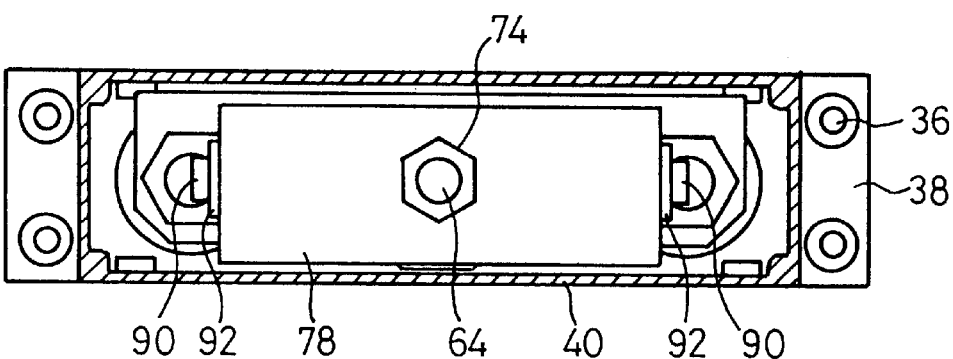
FIG. 6 is a lateral cross-sectional view along the line VI—VI shown in FIG. 3.

Still further, an elongate hole 106 which is substantially elliptically shaped in cross-section is formed in a lower portion of the displacement member 80, wherein the piston rod 64 is disposed so as to be displaceable along the elongate hole 106 as the displacement member 80 is tilted (see FIG. 5).

The gate valve 20 according to the first embodiment of the invention is constructed essentially as described above. Next, the actions and operational effects of the invention shall be described. In the following description, an initial position shall be explained in which the piston 60 is in its lowermost position (bottom dead point) in the cylinder chamber 58, and the communication passageway 28 formed in the valve box 30 is in an opened state and not closed by the valve disk 26.

In this case, at the initial position, because the lever member 78 is being pressed toward the downward side by the elastic force of spring members 84, the pin members 94 affixed to the lever member 78 are kept in a state in which they are held at the lower ends 96a of engagement grooves 96 of the displacement member 80. In addition, at this initial position, the rollers 92 are in state of engagement with the upper parts of the elongate holes 88a, 88b formed in both side surfaces of the lever member 78.

When disposed at this initial position, pressurized fluid is supplied from a pressurized fluid supply source (not shown) to the lower side cylinder chamber 58b through a non-illustrated tube. The piston 60 is raised under action of the pressurized fluid supplied to the lower side cylinder chamber 58b, whereby the piston rod 64 connected to the piston 60 is also raised. In this case, the upper side cylinder chamber 58a is in a state in which it remains open (vented) to atmosphere by operation of a non-illustrated directional control valve.

By raising the piston rod 64, the lever member 78, displacement member 80, valve rods 24a, 24b and the valve disk 26 are raised integrally in unison with the piston rod 64. In this case, the lever member 78 is in a state in which it is pressed toward the downward side by the elastic force of spring members 84, and as a result of the fact that the pair of pin members 94 affixed to both side surfaces of the lever member 78 are held at the lower end parts 96a of engagement grooves 96 of the displacement member 80, the lever member 78 and the displacement member 80 are in a state in which their positioning is preserved at fixed positions, and in which positional slippage or offset in up/down directions, as well as forward/reverse directions (i.e. directions perpendicular to the page as shown in FIG. 3) is prevented. Accordingly, the lever member 78 and the displacement member 80 are raised integrally in unison, while in a set positional state preserving the fixed positioning between these members. Further, when the lever member 78 and displacement member 80 are integrally raised, the support rollers 46, which are axially supported at the upper part of the displacement member 80, do not come into contact with the stepped portions 54 of the cylinder tube 56, and the lever member 78 and displacement member 80 are not guided by the support rollers 46 (see FIG. 4).

When the piston rod 64 is raised, plural balls 66 rotate and circulate along spline grooves 62 formed on the piston rod 64, along with preventing rotation of the piston rod 64 in a circumferential direction by the spline axis receiving member 68 which is affixed to the cylinder tube 56, and hence any turning of the piston rod 64 is stopped.

Figure 7:
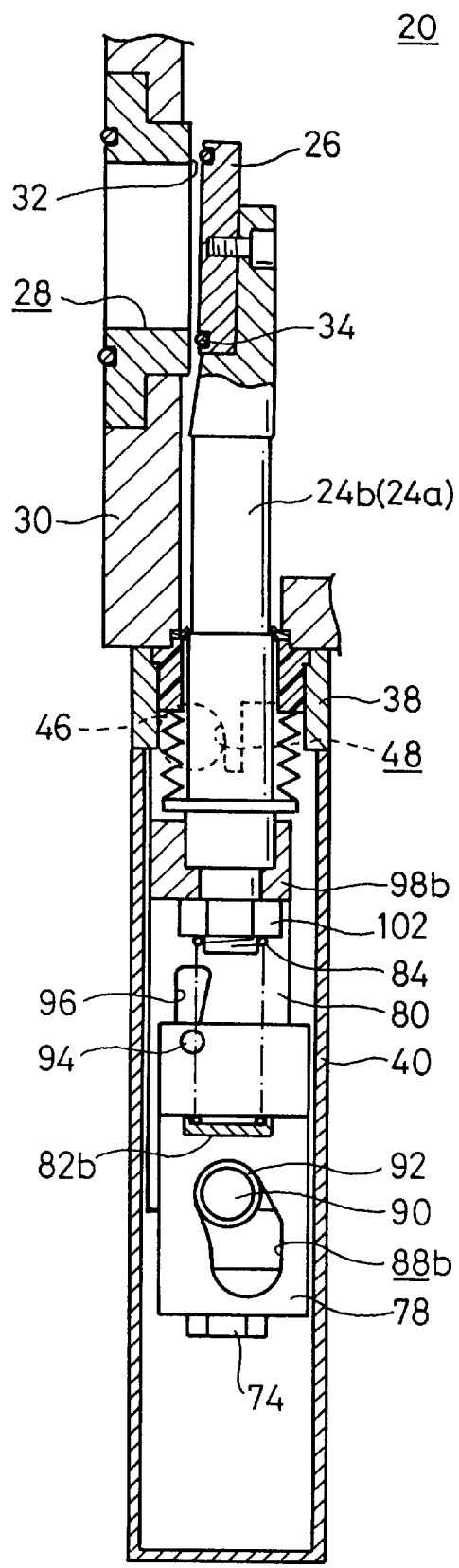
FIG. 7 is a vertical cross-sectional view along the line VII—VII shown in FIG. 3.

By raising the piston rod 64 and bringing an end of the displacement member 80 into abutment with the base plate 38, the displacement member 80 reaches its end position of displacement, and the valve disk 26 occupies a state confronting the opening of the communication passageway 28 (see FIG. 7). At this time, the support rollers 46 disposed on the upper portion of the displacement member 80 engage with curved recesses 48 in the base plate 38, wherein any shock is absorbed by abutment with the first cushioning members 53.

Figure 8:
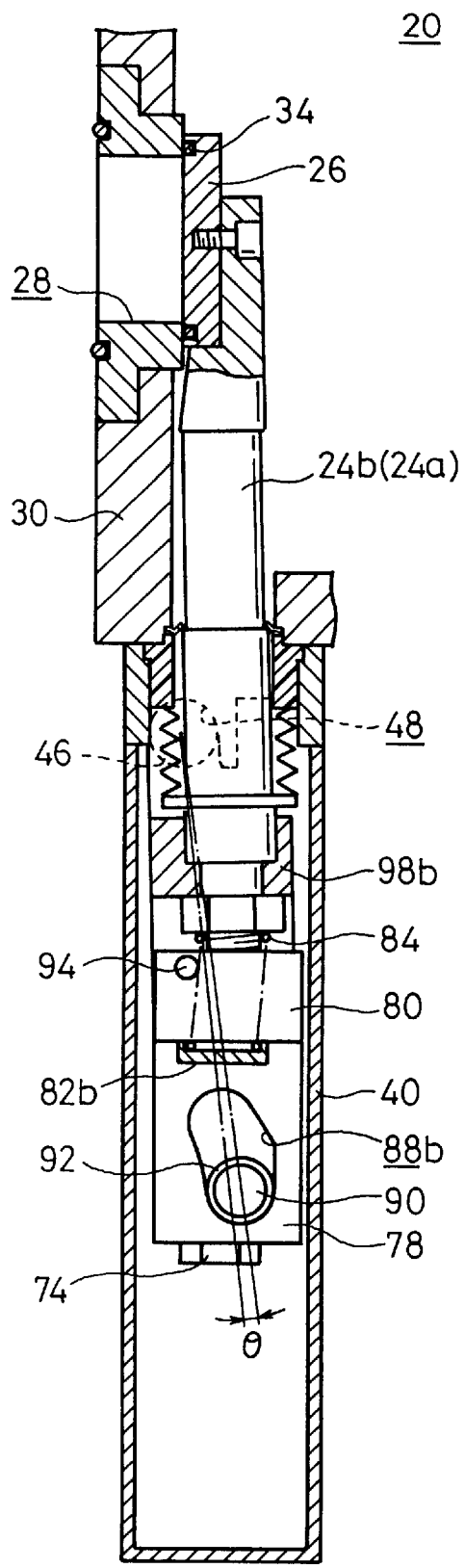
FIG. 8 is a vertical cross-section view showing a seated condition of the valve disk on the valve seat, when the valve rod is tilted by an angle of θ from the state shown in FIG. 7.

After the displacement member 80 has reached its end point of displacement, the piston rod 64 continues to be raised further, whereby the displacement member 80 is inclined a predetermined angle θ only through an engagement action of rollers 92 with respect to the elongate holes 88a, 88b of the lever member 78, with the support rollers 46 which engage the recesses 48 acting as a fulcrum, and the communication passageway 28 is closed by seating of the valve disk 26 onto the valve seat 32 (see FIG. 8).

More specifically, after the displacement member 80 reaches its end point of displacement, by further raising of the piston rod 64 against the opposing elastic force of spring members 84, only the lever member 78 continues to be raised. At this time the displacement member 80, under an engaging action of the rollers 92 with respect to the elongate holes 88a, 88b formed in both side surfaces of the lever member 78, is inclined a predetermined angle θ only, with the support rollers 46 acting as a fulcrum (see FIG. 8).

Further, when the displacement member 80 is inclined about the fulcrum defined by the support rollers 46, the pin members 94 affixed to both side surfaces of the lever member 78 are withdrawn away from the lower sections 96a of the engagement grooves 96 of the displacement member 80, and are raised along the inclined sections 96b thereof.

Accordingly, as a result of the fact that the displacement member 80 is tilted by a predetermined angle θ only, the valve disk 26 which is affixed to the displacement member 80 through valve rods 24a, 24b is displaced from a state in which it is separated by a predetermined interval with respect to the communication passageway 28 to a state in which it is substantially parallel to and facing the communication passageway 28. As a result, the seal member 34 disposed on the valve disk 26 is seated onto the valve seat 32, thereby airtightly closing the communication passageway 28.

Next, in the case that the valve disk 26 is to be separated from the valve seat 32 for opening the communication passageway 28, the piston 60 is lowered by supplying pressurized fluid to the upper side cylinder chamber 58a under a switching action of a non-illustrated directional control valve, and by integral displacement of the piston rod 64, lever member 78 and displacement member 80, the elements are restored to their initial positions. Further, in this case, the lower side cylinder chamber 58b is placed in a state in which it is vented to atmosphere, under action of a non-illustrated directional control valve.

More specifically, after the displacement member is inclined by a predetermined angle θ only in a direction reverse to that previously discussed under an engaging action of rollers 92 with respect to the elongate holes 88a, 88b, the piston rod 64, integrally together with the lever member 78 and displacement member 80, are lowered, thereby returning to their initial positions. At this time, any shock occurring when the piston 60 reaches its bottom dead point is absorbed by the second cushioning member 72 disposed on the bottom surface of the piston 60. Furthermore, when the piston 60 is lowered, because the lever member 78 is pressed downward by the elastic force of spring members 84, the flow amount of pressurized fluid supplied to the upper side cylinder chamber 58a can be restricted.

In the first embodiment, by causing engagement of the pin members 94, which are fixed to both side surfaces of the lever member 78, with engagement grooves 96 of the displacement member 80, the lever member 78 and displacement member 80 are maintained in a positional state at predetermined positions without slippage or offset therebetween in up/down as well as forward/reverse directions, and both members are disposed so as to move upward and downward integrally in unison. In this case, support rollers 46 which are disposed on the upper part of the displacement member 80 are kept out of contact with the stepped portions 54 of the cylinder tube 56, and the displacement member 80 is not guided by the support rollers 46 (see FIG. 4). Accordingly, according to the first embodiment, when the lever member 78 and displacement member 80 are moved upward and downward, any guide means for guiding the lever ember 78 and displacement member 80 is rendered unnecessary, and in comparison with the conventional technique, the number of parts can be reduced and production costs lowered.

Figure 29:
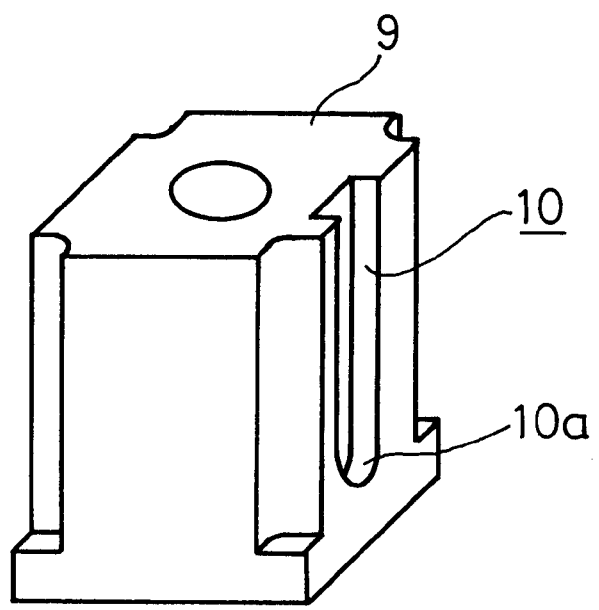
FIG. 29 is a perspective view of a cylinder tube making up part of the structure of the gate valve shown in FIG. 27.

Moreover, in the first embodiment, since a process for machining or cutting out guide grooves 10 (see FIG. 29) in side surfaces of the cylinder tube 9 arranged according to the conventional technique can be eliminated, production steps can be simplified along with reducing production costs.

Further, according to the first embodiment, since a guide means which causes dust and dirt when slidingly displaced along guide grooves 10 as in the conventional technique need not be provided, generation of dust and the like is suppressed, and the gate valve can be suitably used in an environment which demands purity, such as in a clean room environment or the like.

Next, a gate valve 110 in accordance with a second embodiment of the present invention is shown in FIGS. 11 through 14. In the following descriptions, structural features which are the same as those of the gate valve 20 shown in FIG. 1 according to the first embodiment shall be designated by like reference numerals, and detailed discussion thereof shall be omitted.

In the gate valve 110 according to the second embodiment, in place of pin members 94 affixed to the lever member 78 and engagement grooves 96 formed in both side surfaces of the displacement member 80 which make up the structure of the gate valve 20 in the first embodiment, a pair of connecting pins 112a, 112b are provided for preserving integrally the positional state of the lever member 78 and the displacement member 80.

First ends, respectively, of each of the pair of connecting pins 112a, 112b are threadedly attached and affixed to a bottom surface of the displacement member 80, whereas other ends thereof are loosely fitted with a given clearance into elongate holes 114 of the lever member 78. Accordingly, the other ends of the connecting pins 112a, 112b are displaceably disposed along the elongate holes 114. Further, head parts of the connecting pins 112a, 112b, which are tapered in cross-section, are disposed so as to be held in place by tapered sections 116 formed in the elongate holes 114.

In this case, the lever member 78 is in a state of being pressed downward by the elastic force of spring members 84, and as a result of the fact that the heads of the pair of connecting pins 112a, 112b attached to the bottom surface of the displacement member 80 are held in place by the tapered sections 116 of the elongate holes 114 of the lever member 78, the lever member 78 and displacement member 80 together are maintained in a set positional state. Accordingly, the lever member 78 and displacement member 80 are raised and lowered integrally while kept in a state which preserves the set positioning therebetween.

Figure 14:
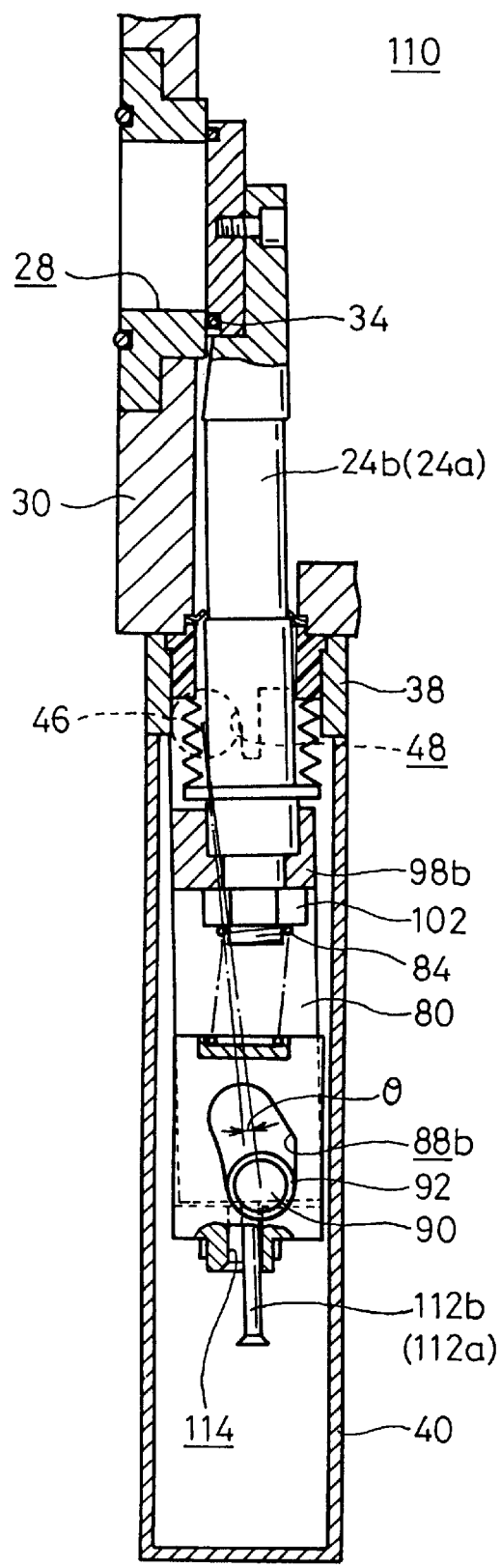
FIG. 14 is a vertical cross-section view showing a seated condition of the valve disk on the valve seat, when the valve rod is tilted by an angle of θ from the state shown in FIG. 12.

Next, after the displacement member 80 reaches its end point of displacement, the lever member 78 continues to be further raised in opposition to the elastic force of spring members 84, and at this time, the heads of the connecting pins 112a, 112b are pulled out to project away from the elongate holes 114 of the lever member 78, whereby the displacement member 80 inclines a predetermined angle θ only with the support rollers 46 acting as a fulcrum (see FIG. 14).

With the second embodiment, owing to the simplified structure of the pair of connecting pins 112a, 112b, the lever member 78 and displacement member 80 can be maintained in a determined positional state, at predetermined positions along the up/down direction, wherein the cost of producing the device can be reduced all the more.

As for other structural features and operational effects, since they are the same as in the first embodiment, detailed explanation thereof has been omitted.

Further, in the formation of the first and second embodiments, the drive source has been described by a cylinder mechanism 42 which causes integral displacement of a piston 60 and piston rod 64 under action of a pressurized fluid. However, the invention is not limited to such structure, and though not illustrated, for example, a linear actuator, rotational drive source, electric actuator or the like may easily be utilized for the drive source.

Next, a gate valve according to a third embodiment of the present invention is shown in FIG. 15.

The gate valve 220 according to the third embodiment includes a drive means (drive source) 222, a valve rod 224 which is displaced along the up/down directions under a driving action of the drive means 222, a valve rod 224 which it tiltably movable in directions substantially transverse to the up/down directions, and an elongate shaped valve disk 226 connected to an end of the valve rod 224. An annular step member 227, gradually expanding downwardly in diameter, is formed around the outer peripheral surface of a roughly central portion of the valve rod 24.

A valve box 230 having defined therein a communication passageway 228 for withdrawal and insertion of a non-illustrated workpiece, is disposed on an upper side of the drive means 222 (see FIGS. 20 and 21), wherein the communication passageway 228 is airtightly closed by seating of the valve disk 226 onto a valve seat 232 formed on an inner wall surface of the valve box 230. A seal member 234 is arranged on the valve disk 226 along an annular-shaped groove, whereby as a result of the seal member 234, air-tightness is preserved when the valve disk 226 is seated on the valve seat 232.

The drive means 222 includes a first base plate 236 and a second base plate 238 which are affixed to the bottom surface of the valve box 230 through non-illustrated screws, a casing 240 having a bottomed tubular shape attached to the second base plate 238, and first and second cylinder mechanisms 242a, 242b (drive mechanisms) formed of the same structural elements, and which are arranged roughly in parallel inside of the casing 240.

Figure 16:
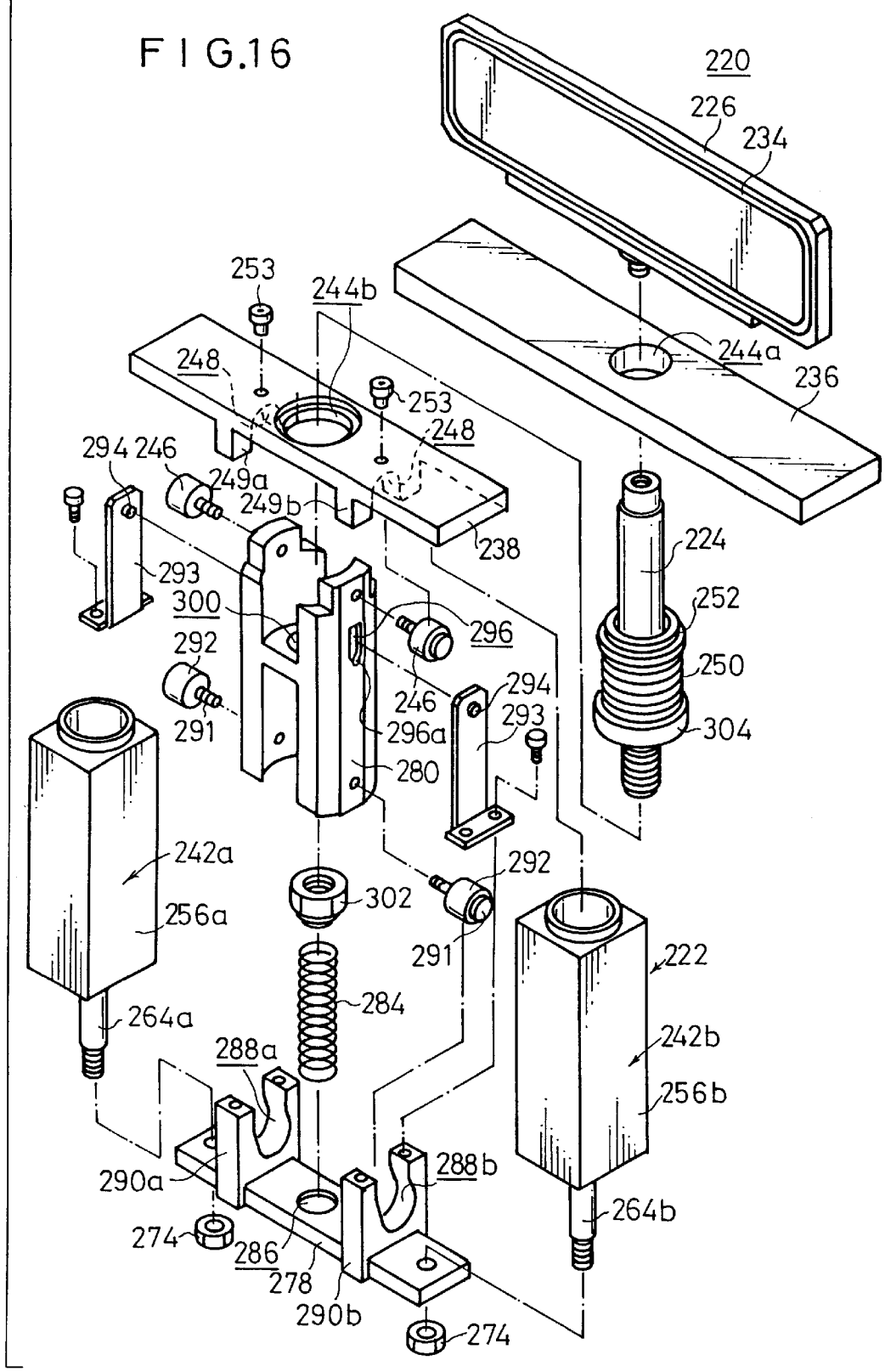
FIG. 16 is an exploded perspective view of the gate valve shown in FIG. 15.

As shown in FIG. 16, through holes 244a, 244b having generally circular cross-sections for insertion therethrough of the valve rod 224, are formed respectively in roughly central regions of the first and second base plates 236, 238. Further, a pair of projections 249a, 249b formed with substantially semi-circular cross-sectionally shaped recesses 248 for supporting the support rollers 246 (to be discussed later) are disposed at a fixed interval separation on a lower surface portion of the second base plate 238. The diameters of the through holes 244a, 244b are formed to be larger than the diameter of the rod 224, and further, a ring 252 for supporting an end of a bellows 250 which surrounds and covers a given portion of the valve rod 224, is fitted in the through hole 244b.

Figure 22:
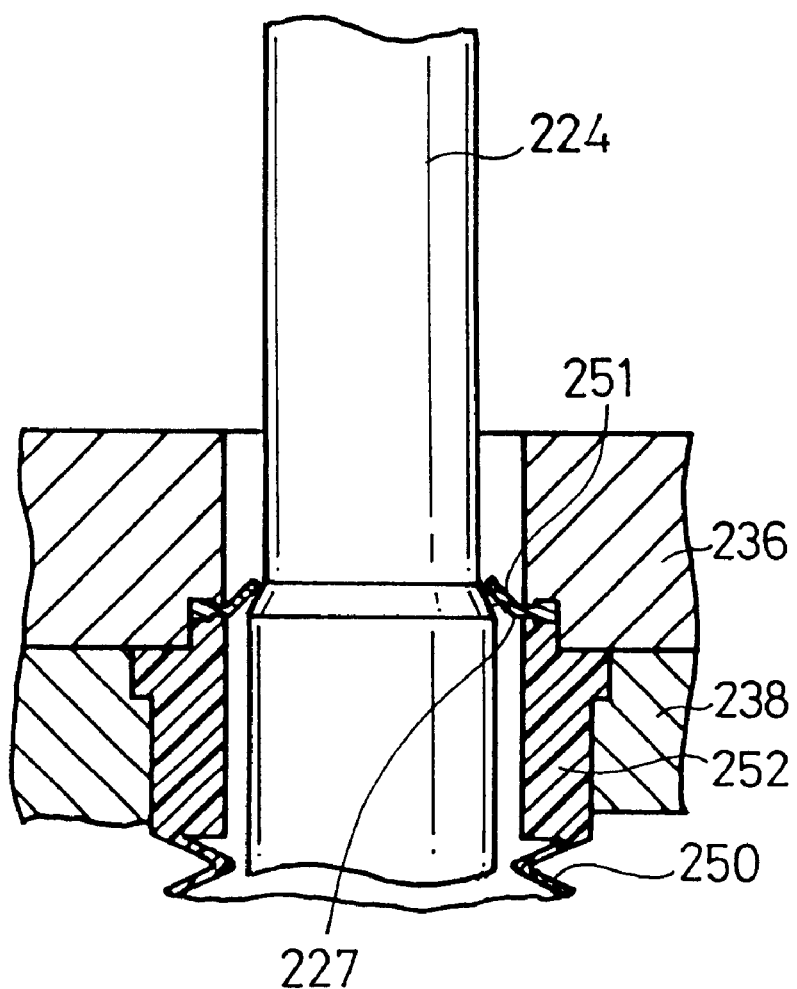
FIG. 22 is a partially expanded vertical cross-sectional view illustrating a packing for sealing of the valve rod.
Figure 23:
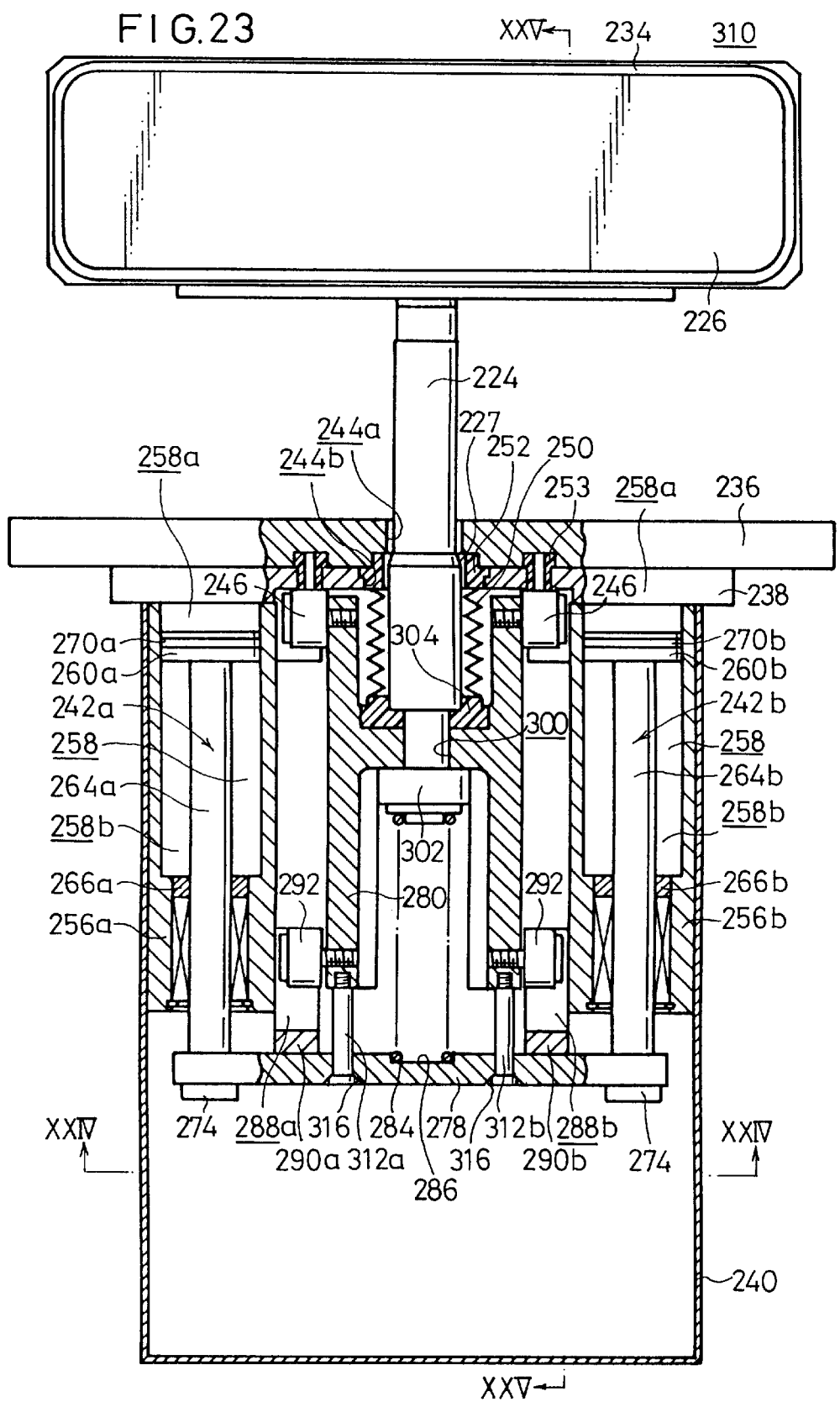
FIG. 23 is a vertical cross-sectional view taken along an axial direction of a gate valve according to a fourth embodiment of the present invention.
Figure 25:
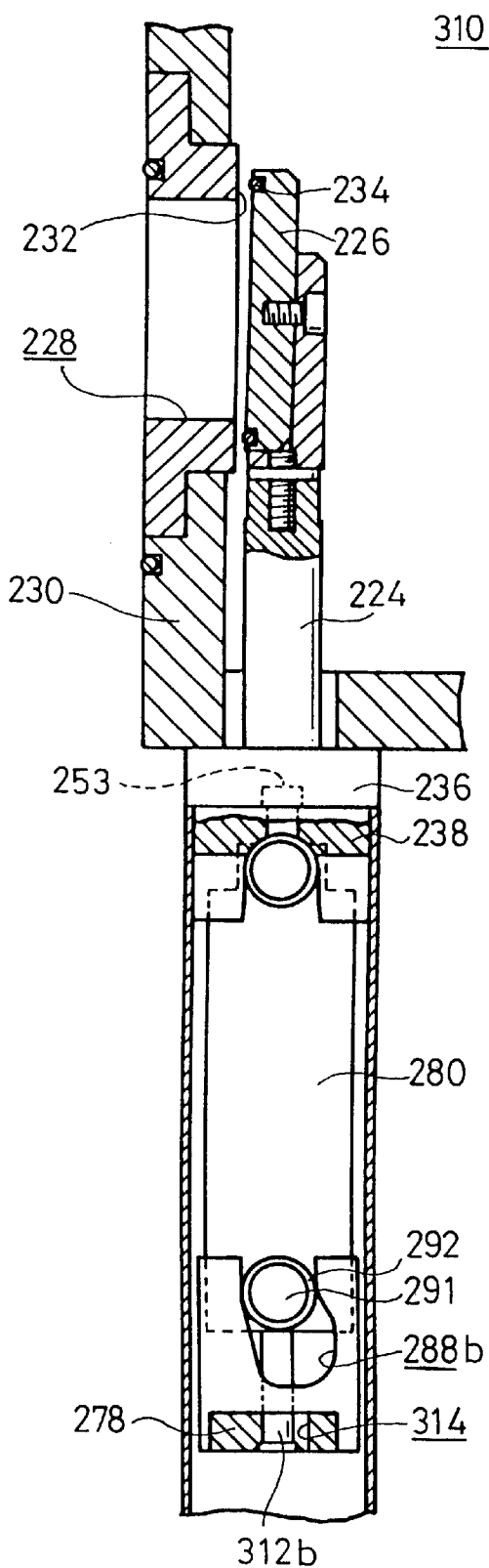
FIG. 25 is a vertical cross-sectional view along the line XXV—XXV shown in FIG. 23.
Figure 26:
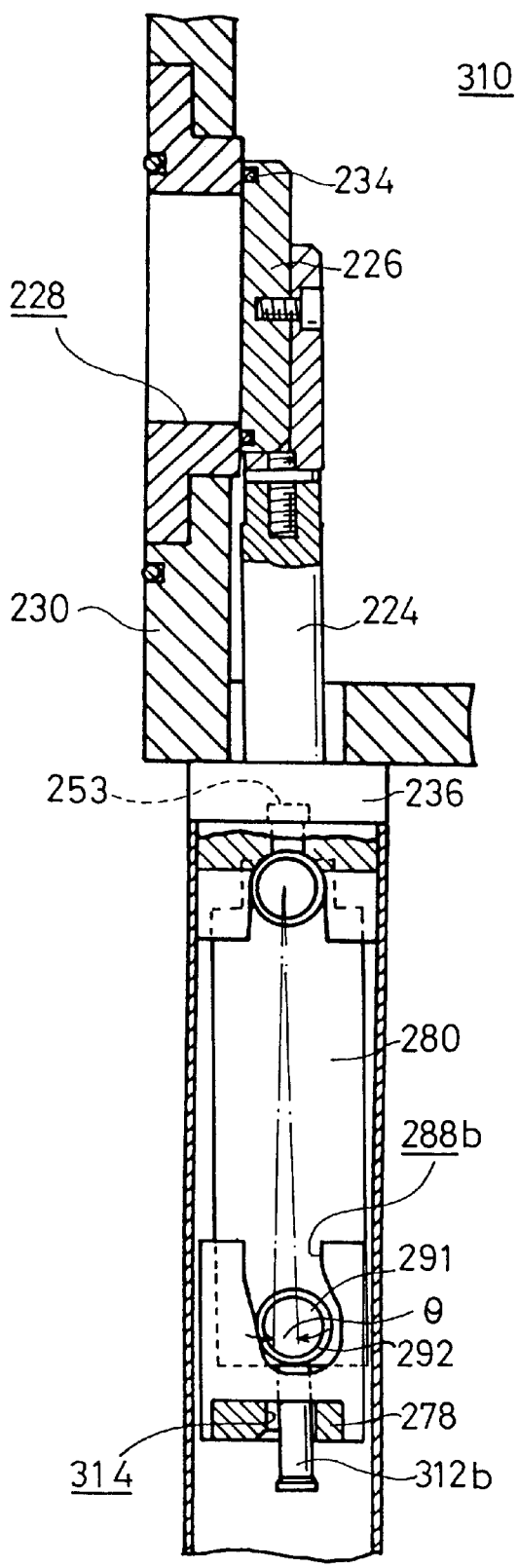
FIG. 26 is a vertical cross-section view showing a seated condition of the valve disk on the valve seat, when the valve rod is tilted by an angle of θ from the state shown in FIG. 25.
Figure 27:
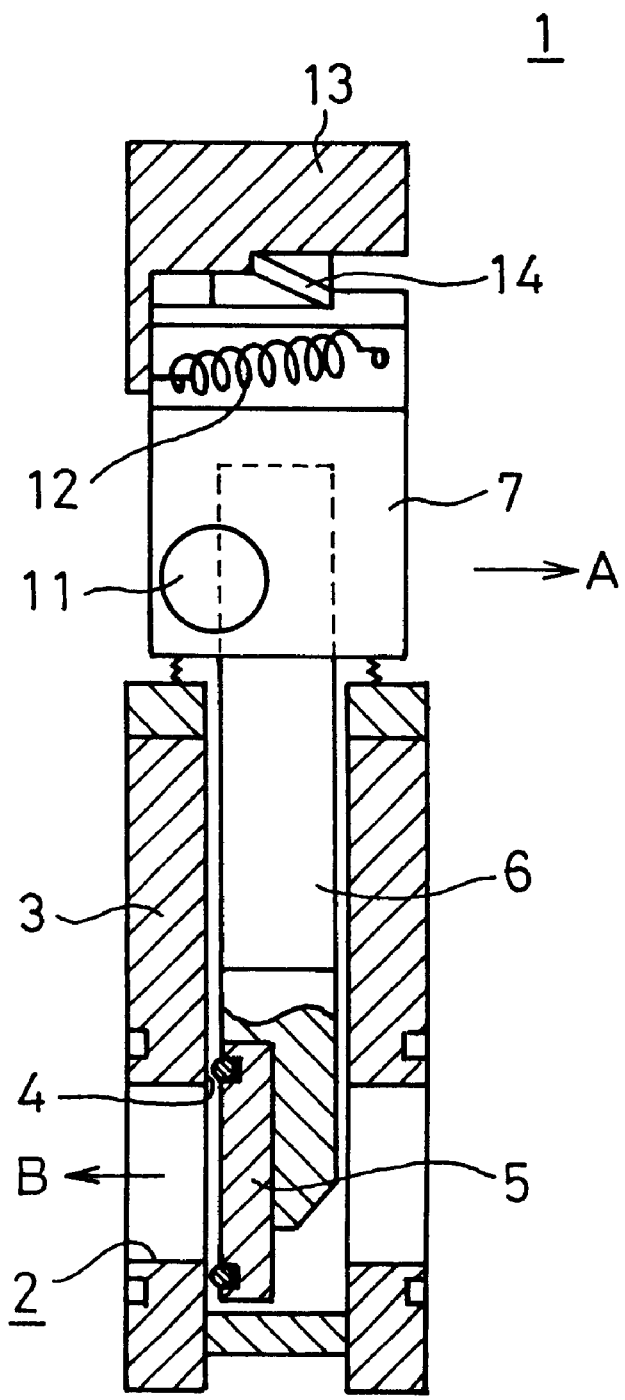
FIG. 27 is a vertical cross-sectional view along the axial direction of a gate valve in accordance with a conventional technique.
Figure 28:
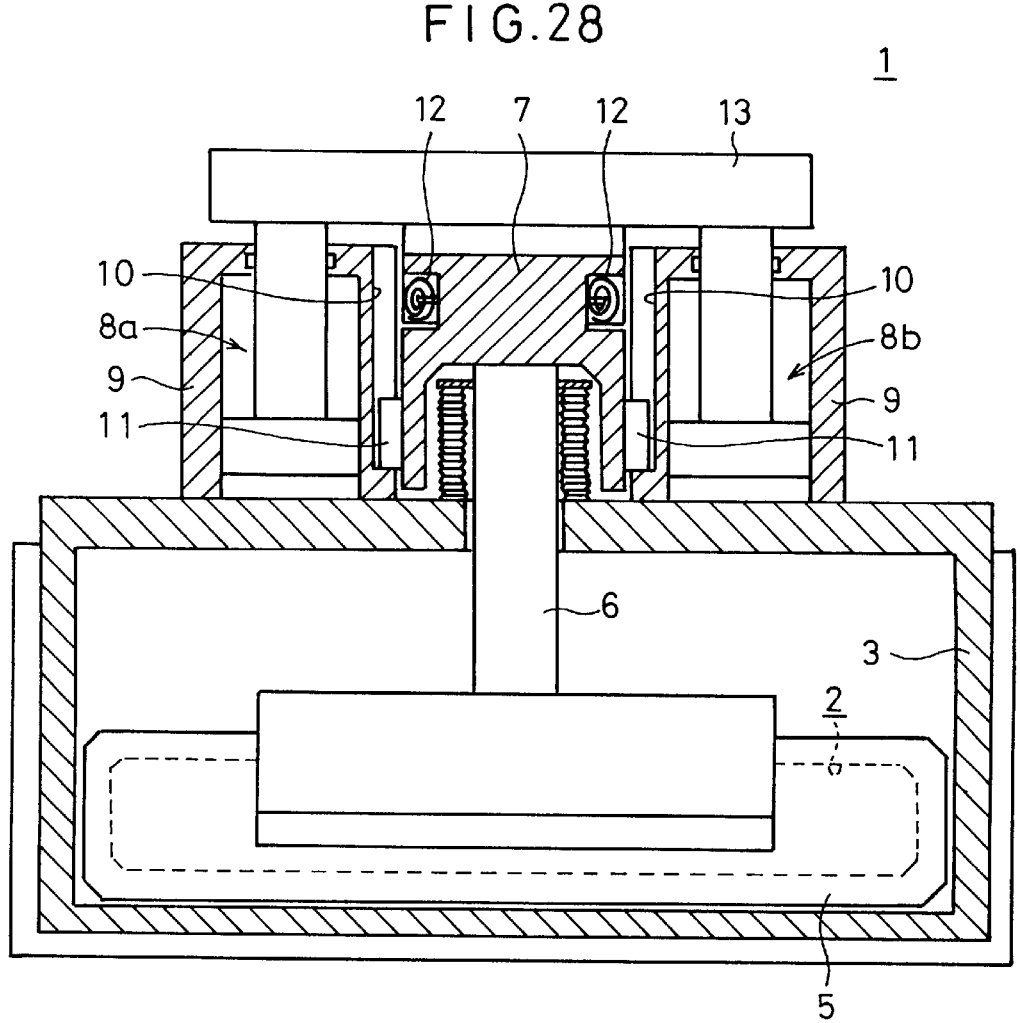
FIG. 28 is a vertical cross-sectional view along an axial direction of the gate valve shown in FIG. 27.

As shown in FIG. 22, a packing (seal member) 251 which surrounds an outer circumferential surface of the valve rod 224 is gripped between the first and second base plates 236 and 238. When the pair of pistons 260a, 260b are raised, the packing contacts with an annular step 227 of the valve rod 224, serving a sealing function. Further, because the packing 251 is disposed so that it does not make contact with other peripheral surfaces of the valve rod 224 apart from the annular step 227, generation of dust or dirt due to friction is prevented.

Figure 17:
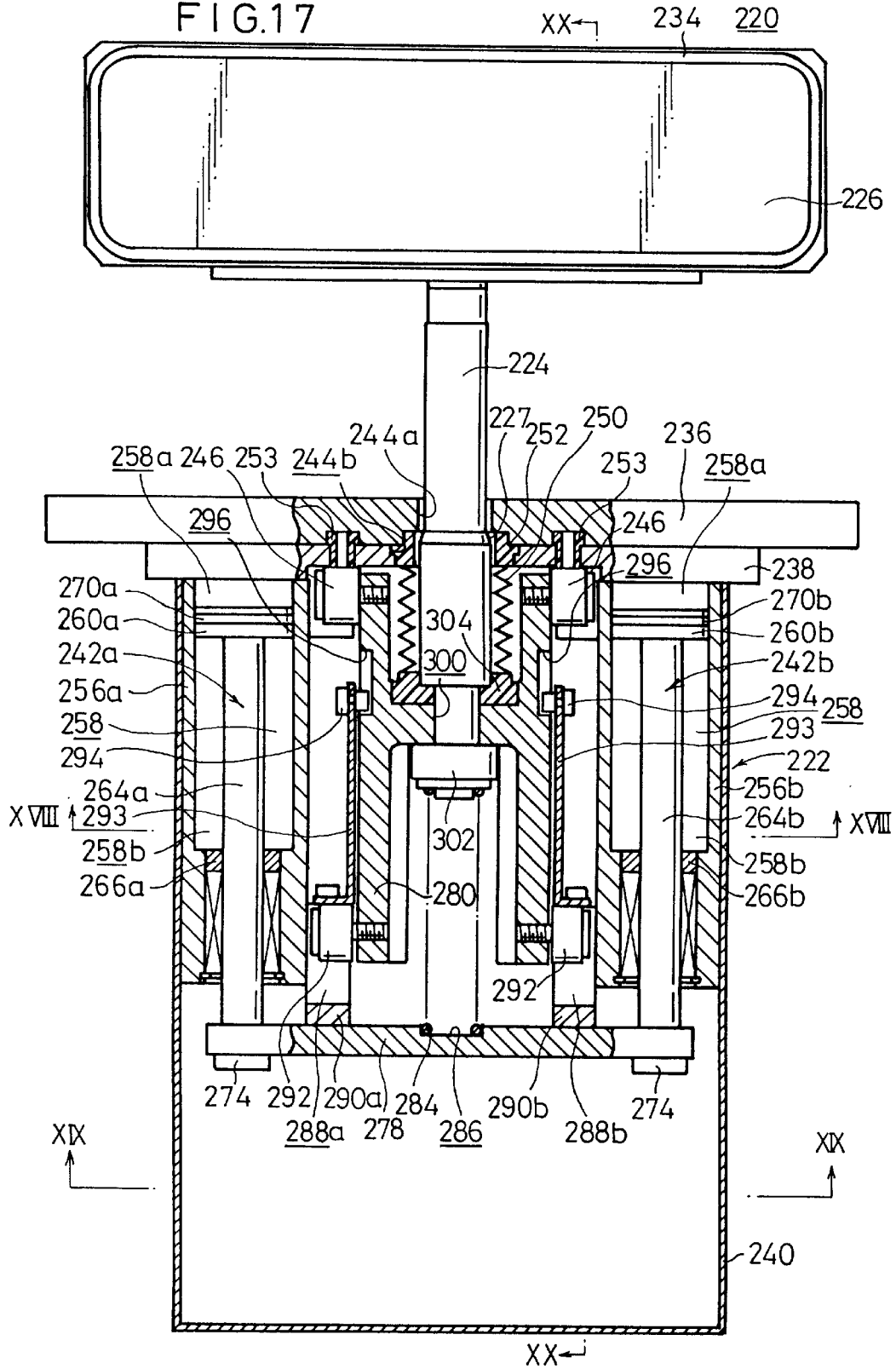
FIG. 17 is a vertical cross-sectional view along the axial direction of the gate valve shown in FIG. 15.
Figure 18:
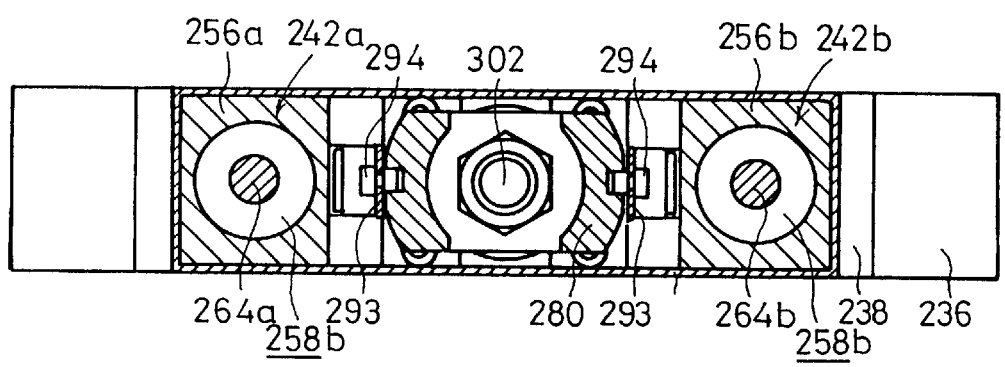
FIG. 18 is a lateral cross-sectional view along the line XVIII—XVIII shown in FIG. 17.

Further, as shown in FIGS. 16 and 17, first cushioning members 253 which are formed, for example, of a resinous material such as a urethane or polyurethane resin or the like, are disposed inside holes in the second base plate 238, wherein the first cushioning members 253 are gripped by and between the first base plate 236 and the second base plate 238. When the support rollers 246 engage with the recesses 248, the first cushioning members 253 abut with the support rollers 246, thereby serving a function for absorbing the shock of the support rollers 246.

Because the first cylinder mechanism 242a and second cylinder mechanism 242b, respectively, are constructed from the same structural elements, detailed explanation of only the first cylinder mechanism 242a shall be given, whereas the same structural elements pertaining to the second cylinder mechanism 242b shall be indicated by the letter symbol b, with further detailed explanation thereof omitted.

As shown in FIG. 17, the first cylinder mechanism 242a includes a cylinder tube 256a fixed to the second base plate 238 through a non-illustrated attachment means, a piston 260a which is displaceably accommodated along a cylinder chamber 258 on the interior of the cylinder tube 256a, a piston rod 264a which is connected to one end of the piston 260a, and a seal member 266a maintained on the cylinder tube 256a and surrounding an outer circumferential surface of the piston rod 264a.

A piston packing 270a for preserving airtightness between respective upper side 258a and lower side 258b cylinder chambers, which are divided by the piston 260a, is arranged over an outer peripheral surface of the piston 260a. Further, a second cushioning member is arranged on a bottom surface part of the piston 260a, for absorbing a shock when the piston 260a reaches its bottom dead point. The second cushioning member may suitably be formed of a resinous material, for example, a urethane resin, polyurethane resin or the like.

In this case, pressurized fluid (for example, pressurized air) is supplied through a non-illustrated tube connected to a pressurized fluid supply source (also not shown) to the upper and lower side cylinder chambers 258a, 258b, whereby under a switching action of a non-illustrated directional control valve, pressurized fluid is supplied to either one of the upper side cylinder chamber 258a or lower side cylinder chamber 258b.

Furthermore, as shown in FIGS. 16 and 17, the drive means 222 includes a yoke 278 formed as a longitudinally dimensioned plate, affixed respectively to other ends of the pair of piston rods 264a, 264b through lock nuts 274, and a displacement block 280 which is displaced integrally with the yoke 278 and formed to have an H-shape in vertical cross-section.

As shown in FIGS. 16 and 17, a substantially circular-shaped recess 286 which engages with an end part of a threaded member (discussed hereinafter) is formed in a central part of the yoke 278. Further, a pair of support blocks 290a, 290b which have substantially elliptically-shaped elongate holes cut out therein are affixed at a predetermined interval separation on the yoke 278, wherein rollers 292 which are axially attached to the displacement block 280 through pin members 291 are disposed so as to engage with the elongate holes 288a, 288b. The rollers 292 are rotatably axially supported centrally about pin members 291.

Further, support plates 293 are affixed to upper parts of the pair of support blocks 290a, 290b, respectively, via threaded members. A pair of pin members 294 are fitted in place into the support plates 293 through holes, wherein ends of the pin members 294 are disposed for engagement with engagement grooves 296 formed in both side surfaces of the displacement block 280.

As shown in FIGS. 16 and 17, a hole 300, substantially circular-shaped in cross-section, and thorough which another end of the valve rod 224 is fittingly inserted, is formed in a roughly central part in the displacement block 280, wherein the valve rod 224 is affixed to the displacement block 280 through a lock nut 302 which is Joined to a threaded end part of the valve rod 224. The valve rod 224 and spring member 284 are interveningly disposed between the displacement block 280 and the yoke 278, wherein one end of the spring member 284 engages with the lock nut 302, and the other end of the spring member 284 engages with the recess 286 of the yoke 278.

A bellows 250 is disposed in covering relation around an outer peripheral surface of another end side of the valve rod 224, wherein one end of the bellows is fixed by a support ring 252 to the second base plate 238, and the other end thereof is affixed to a ring body 304 externally fitted over the valve rod 224.

Further, engagement grooves 296 for engagement with ends of pin members 294 which are held in place in the yoke 278 by way of the support blocks 290a, 290b and support plates 293, are formed respectively in both side surfaces of the displacement block 280. Through engagement of the pin members 294 in lower portions 296a of the engagement grooves 296, positional slippage or offset between the yoke 278 and displacement block 280 in the up/down directions, as well as the forward/reverse directions (i.e. directions perpendicular to the page as shown in FIG. 17) is prevented, and moreover, such members are positioned at a fixed interval separation along the up/down direction, and are movable up and down integrally in this manner in a set positional state. In addition, the valve disk 226 is tiltably movable by withdrawal of the pin members 294 away from the lower end portion 296a of the engagement grooves 296 and by raising along the engagement grooves 296.

Furthermore, a pair of support rollers 246 are rotatably axially supported on branched upper portions of the displacement block 280, wherein such support rollers 246 are inserted into curved recesses 248 formed in the projections 249a, 249b of the second base plate 238, when the displacement block 280 is at its end point of displacement, whereby the valve disk 226, valve rod 224 and the displacement block 280 are tiltably moved through a predetermined angle θ only, using the support rollers 246 which engage with recesses 248 as a fulcrum.

The gate valve 220 according to the third embodiment of the invention is constructed essentially as described above. Next, the actions and operational effects of the invention shall be described. In the following description, an initial position shall be explained in which the pair of pistons 260a, 260b are in their lowermost positions, respectively, in the cylinder chambers 258, and the communication passageway 228 formed in the valve box 230 is in an opened state and not closed by the valve disk 226.

In this case, at the initial position, because the yoke 278 is being pressed toward the downward side by the elastic force of the spring 284, the pin members 294 affixed to the yoke 278 through the support blocks 290a, 290b and support plates 293, are kept in a state in which they are held at the lower ends 296a of the engagement grooves 296 of the displacement block 280. In addition, at this initial position, the rollers 292 are in state in which they engage the upper parts of elongate holes 288a, 288b formed in the support blocks 290a, 290b.

When disposed at the initial position, pressurized fluid is supplied from a pressurized fluid supply source (not shown) to the lower side cylinder chambers 258b of the first and second cylinder mechanisms 242a and 242b, respectively, through non-illustrated tubes. The pistons 260a, 260b are raised under action of the pressurized fluid supplied to the lower side cylinder chambers 258b, whereby the pair of piston rods 264a, 264b connected to the pistons 260a, 260b are also respectively raised. In this case, the upper side cylinder chambers 258a are in a state in which they remain open (vented) to atmosphere by operation of non-illustrated directional control valves.

By raising substantially in parallel the pair of piston rods 264a and 264b, the piston rods 264a, 264b together with the yoke 278, displacement block 280, valve rod 224 and valve disk 226 are raised integrally. In this case, the yoke 278 is in a state in which it is pressed toward the downward side by the elastic force of the spring member 284, and as a result of the fact that the pair of pin members 294, which are affixed to the yoke 278 via support blocks 290a, 290b and support plates 293, are held at the lower end parts 296a of the engagement grooves 296 of the displacement block 280, the yoke 278 and the displacement block 280 are kept in a state in which their positioning is preserved at fixed positions, and in which positional slippage or offset in up/down directions, as well as in forward/reverse directions (i.e. directions perpendicular to the page as shown in FIG. 17) is prevented. Accordingly, the yoke 278 and the displacement block 280 are raised integrally in unison, while in a set positional state preserving the fixed positioning between these members.

Figure 20:
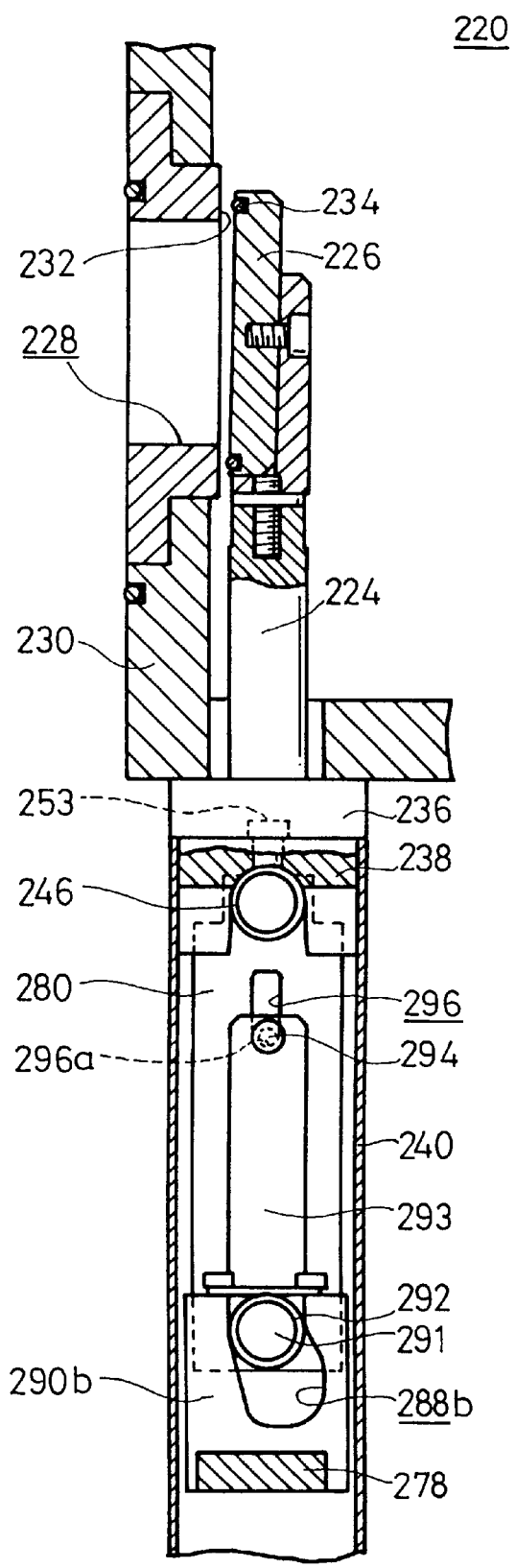
FIG. 20 is a vertical cross-sectional view along the line XX—XX shown in FIG. 17.

The piston rods 264a, 264b are raised roughly simultaneously, and by engagement of an end of the displacement block 280 with the second base plate 238, the displacement block 280 reaches its end point of displacement, wherein the valve disk 226 is placed in a state confronting the opening port of the communication passageway 228 (see FIG. 20). At this time, the pair of support rollers 246 disposed on the upper part of the displacement block 280 engage respectively in the curved recesses 248 formed in the projections 249a, 249b of the second base plate 238, and in addition, by abutment against the first cushioning members 253, any shock caused thereby is absorbed.

Figure 21:
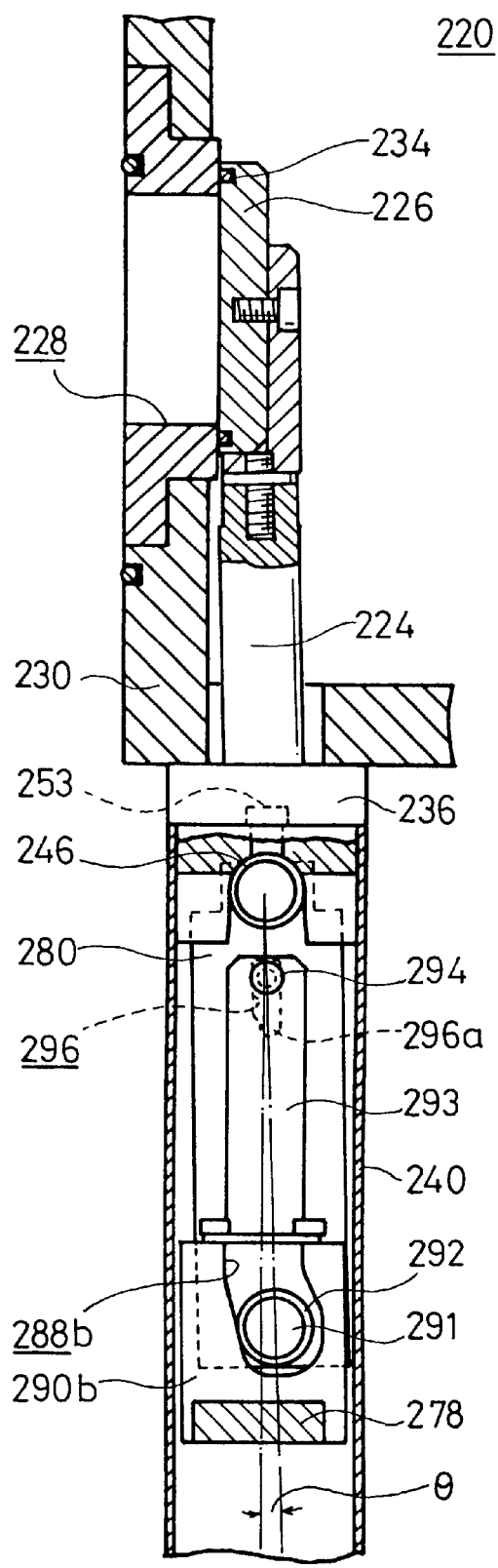
FIG. 21 is a vertical cross-section view showing a seated condition of the valve disk on the valve seat, when the valve rod is tilted by an angle of θ from the state shown in FIG. 20.

After the displacement block 280 has reached its end point of displacement, the pair of piston rods 264a, 264b continue to be raised, respectively, still further, whereby the displacement block 280, under an engaging action of the rollers 292 with respect to the elongate holes 288a, 288b of the yoke 278, is tiltably moved with the support rollers 246 being in engagement with the recesses 248 serving as a fulcrum, wherein the valve disk 226 is seated onto the valve seat 232 thereby closing the communication passageway (see FIG. 21).

More specifically, after the displacement block 280 reaches its end point of displacement, by further raising of the pair of piston rods 264a, 264b against the opposing elastic force of spring member 284, only the yoke 278 continues to be raised. At this time the displacement block 280, under an engaging action of the rollers 292 with respect to the elongate holes 288a, 288b formed in both side surfaces of the yoke 278, is inclined a predetermined angle θ only, with the support rollers 246 acting as a fulcrum (see FIG. 21). Further, when the displacement block 280 is inclined about the fulcrum defined by the support rollers 246, the pin members 294 affixed to both side surfaces of the yoke 278 are withdrawn away from the lower end sections 296a of the engagement grooves 296 of the displacement block 280, and are raised along the engagement grooves 296.

Accordingly, as a result of angular displacement of the displacement block 280 through a predetermined θ only, the valve disk 226, which is fixed to the displacement block 280 through the valve rod 224, is displaced from a state where it confronts the communication passageway 228 by a predetermined interval separation, to now be substantially parallel to a side of the communication passageway 228. As a result, the seal member 234 disposed on the valve disk 226 becomes seated on the valve seat 232 and the communication passageway 228 is airtightly closed.

Next, in the case that the valve disk 226 is caused to separate away from the valve seat 232 to open the communication passageway 228, under a switching action of a non-illustrated directional control valve, pressurized fluid is supplied substantially simultaneously to the upper side cylinder chambers 258a of the first and second cylinder mechanisms 242a and 242b, whereby the pair of pistons 260a, 260b are lowered substantially simultaneously, and the piston rods 264a, 264b, yoke 278 and displacement block 280 are lower integrally and restored to their initial positions. Further, in this case, the lower side cylinder chambers 258b are in a state of being vented to atmosphere, by a switching operation of non-illustrated directional control valves.

More specifically, after the displacement block 280 is inclined by a predetermined angle θ only in a direction reverse to that previously discussed under an engaging action of rollers 292 with respect to the elongate holes 288a, 288b and the valve disk 226 is securely separated away from the valve seat 232, the pair of piston rods 264a, 264b integrally together with the yoke 278 and displacement block 280, are lowered, thereby returning to their initial positions. At this time, any shock occurring when the pistons 260a, 260b reach their bottom dead points is absorbed by the second cushioning members disposed on the bottom surface of the pistons 260a, 260b.

In the third embodiment, by causing engagement of the pin members 294, which are fixed to the yoke 278 via the support blocks 290a, 290b and support plates 293, with engagement grooves 296 of the displacement block 80, the yoke 278 and displacement block 280 are maintained in a set positional state at predetermined positions without slippage or offset therebetween in up/down as well as forward/reverse directions, and both members are disposed so as to move upward and downward integrally in unison. Accordingly, in the third embodiment, when the yoke 278 and displacement block 280 are moved upward and downward, any guide means for guiding the yoke 278 and displacement block 280 is rendered unnecessary, and in comparison with the conventional technique, the number of parts can be reduced and production costs lowered.

Moreover, in the third embodiment, since a process for machining or cutting out guide grooves 10 (see FIG. 29) in side surfaces of the cylinder tubes 9 arranged according to the conventional technique can be eliminated, production steps can be simplified along with reducing production costs.

Further, according to the third embodiment, since a guide means which causes dust and dirt when slidingly displaced along guide grooves 10 as in the conventional technique need not be provided, generation of dust, dirt and the like is suppressed, and the gate valve can be suitably used in an environment which demands purity, such as in a clean room environment or the like.

Next, a gate valve 310 in accordance with a fourth embodiment of the present invention is shown in FIGS. 23 through 26. In the following descriptions, structural features which are the same as those of the gate valve 220 shown in FIG. 15 according to the third embodiment shall be designated by like reference numerals, and detailed discussion thereof shall be omitted.

In the gate valve 310 according to the fourth embodiment, in place of pin members 294 affixed to the yoke 278 and engagement grooves 296 formed in both side surfaces of the displacement block 280 which make up the structure of the gate valve 220 in the third embodiment, a pair of connecting pins 312a, 312b are provided for preserving integrally the positional state of the yoke 278 and the displacement block 280, respectively, in which positional slippage or offset in either of the up/down or forward/reverse directions does not occur.

First ends, respectively, of each of the pair of connecting pins 312a, 312b are threadedly attached to a bottom surface of the displacement block 280, whereas other ends thereof are loosely fitted with a given clearance into elongate holes 314 of the yoke 278. Accordingly, the other ends of the connecting pins 312a, 312b are displaceably disposed along the elongate holes 314. Further, head parts of the connecting pins 312a, 312b, which are tapered in cross-section, are disposed so as to be held in place by tapered sections 316 formed in the elongate holes.

In this case, the yoke 278 is in a state of being pressed downward by the elastic force of spring members 284, and as a result of the fact that the heads of the pair of connecting pins 312a, 312b attached to the bottom surface of the displacement block 280 are held in place by the tapered sections of the elongate holes 314 of the yoke 278, the yoke 278 and displacement block 280 together are maintained in a determined positional state. Accordingly, the yoke 278 and displacement block 280 are raised and lowered integrally while kept in a state which preserves the set positioning therebetween.

Next, after the displacement block 280 reaches its end point of displacement, the yoke 278 continues to be further raised in opposition to the elastic force of spring member 284, and at this time, the heads of the connecting pins 312a, 312b are pulled out projecting away from the elongate holes 314 of the yoke 278, whereby the displacement block 280 inclines a predetermined angle θ only with the support rollers 246 acting as a fulcrum.

With the fourth embodiment, owing to the simplified structure of the pair of connecting pins 312a, 312b, the yoke 278 and displacement block 280 can be maintained in a determined positional state, at predetermined positions along the up/down direction, whereas the cost of producing the device can be reduced all the more.

As for other structural and operational effects, since they are the same as in the third embodiment, detailed explanation thereof shall be omitted.

Further, in the formation of the third and fourth embodiments, the plurality of drive mechanisms have been described by first and second cylinder mechanisms 242a, 242b which cause integral displacement of pistons 260a, 260b and piston rods 264a, 264b under action of a pressurized fluid.

However, the invention is not limited to such a structure, and though not illustrated, for example, linear actuators, rotational drive sources, electric actuators and the like may easily be utilized for the plurality of drive mechanisms.

What is claimed is:

1. A gate valve, comprising:
   a drive source;
   a first displacement member connected to a drive shaft of said drive source and displaceable along an axial direction under a driving action of said drive source;
   a second displacement member displaceable integrally with said first displacement member along the axial direction, and further being tiltably movably disposed about a support member acting as a fulcrum at an end point of displacement along the axial direction;
   a valve disk for opening and closing a passageway through a valve rod connected to said second displacement member; and
   a positioning support mechanism for maintaining said first displacement member and said second displacement member in a predetermined positional state along their direction of displacement,
   wherein said positioning support mechanism comprises a spring member interveningly disposed in a compressed state between said first displacement member and said second displacement member, for urging said first displacement member away from said second displacement member.

2. The gate valve according to claim 1, wherein said positioning support mechanism further comprises a pin member fixed in a side surface of said first displacement member, and an engagement groove formed in a side surface of said second displacement member and engaging said pin member.

3. The gate valve according to claim 1, wherein said positioning support mechanism further comprises a connecting pin having one end thereof slidably fitted in an elongate hole defined in said first displacement member and another end thereof affixed to said second displacement member.

4. The gate valve according to claim 1, wherein said drive source comprises a single cylinder mechanism for causing displacement of a piston and piston rod along the axial direction under the action of a pressurized fluid, said cylinder mechanism including a rotation stopping member for preventing rotational movement in a circumferential direction of said piston rod.

5. The gate valve according to claim 4, wherein said rotation stopping member comprises spline grooves formed on said piston rod extending along the axial direction, and a spline axis receiving member having disposed therein a plurality of balls for rolling movement along said spline grooves.

6. The gate valve according to claim 1, wherein said support member comprises a pair of support rollers rotatably axially supported at one end of said second displacement member (80), said support rollers being disposed for engagement with curved recesses formed in a base plate when said second displacement member is at a position of an end point of displacement thereof.

7. The gate valve according to claim 6, further comprising first cushioning members disposed in said recesses for absorbing a shock when said support rollers abut against said recesses.

8. The gate valve according to claim 4, further comprising a second cushioning member for absorbing a shock applied by said piston when said piston reaches its dead bottom point.

9. The gate valve according to claim 4, further comprising a seal member for contacting and forming a seal with annular members formed on an outer circumferential surface of the valve rod, when said piston reaches respective end positions of its displacement.

10. A gate valve comprising:
   a drive source having a plurality of substantially parallel disposed drive mechanisms;
   a yoke connected respectively to drive axes of said plurality of drive mechanisms, for displacement along an axial direction under a driving action of said plurality of drive mechanisms;

a displacement block displaceable along the axial direction integrally with said yoke, and further being tiltably movably disposed about a support member acting as a fulcrum, at an end point of displacement along the axial direction;

a valve disk for opening and closing a passageway through a valve rod connected to said displacement block; and a positioning support mechanism for maintaining said yoke and said displacement block in a predetermined positional state along their direction of displacement, wherein said positioning support mechanism comprises a spring member interveningly disposed in a compressed state between said yoke and said displacement block, for urging said yoke away from said displacement block.

11. The gate valve according to claim 10, wherein said positioning support mechanism further comprises a pin member fixed in said yoke through a support block and a support plate, and an engagement groove formed in a side surface of said displacement block and engaging said pin member.

12. The gate valve according to claim 10, wherein said positioning support mechanism further comprises a connecting pin having one end thereof slidably fitted in an elongate hole defined in said yoke and another end thereof affixed to said displacement block.

13. The gate valve according to claim 10, wherein said plurality of drive mechanisms comprise first and second cylinder mechanisms for causing displacement of pistons and piston rods along the axial direction under the action of a pressurized fluid supplied to cylinder chambers.

14. The gate valve according to claim 10, wherein said support member comprises a pair of support rollers rotatably axially supported at one end of said displacement block, said support rollers being disposed for engagement with curved recesses formed in a base plate when said displacement block is at a position of an end point of displacement thereof.

15. The gate valve according to claim 14, further comprising first cushioning members disposed in said recesses for absorbing a shock when said support rollers abut against said recesses.

16. The gate valve according to claim 10, further comprising a seal member for contacting and forming a seal with an annular member formed on an outer circumferential surface of the valve rod.

* * * * *